(12) United States Patent
Yamayoshi et al.

(10) Patent No.: US 11,813,700 B2
(45) Date of Patent: *Nov. 14, 2023

(54) ALUMINUM ALLOY BRAZING SHEET AND MANUFACTURING METHOD THEREOF

(71) Applicant: UACJ Corporation, Tokyo (JP)

(72) Inventors: Tomoki Yamayoshi, Tokyo (JP); Hidetoshi Kumagai, Tokyo (JP); Hirokazu Tanaka, Tokyo (JP); Taketoshi Toyama, Kariya (JP); Naoki Sugimoto, Kariya (JP); Nobuhiro Honma, Kariya (JP); Shogo Yamada, Kariya (JP); Takahiro Shinoda, Kariya (JP)

(73) Assignee: UACJ CORPORATION, Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 17/628,370

(22) PCT Filed: Jul. 6, 2020

(86) PCT No.: PCT/JP2020/026324
§ 371 (c)(1),
(2) Date: Jan. 19, 2022

(87) PCT Pub. No.: WO2021/020036
PCT Pub. Date: Feb. 4, 2021

(65) Prior Publication Data
US 2022/0281040 A1     Sep. 8, 2022

(30) Foreign Application Priority Data

Jul. 26, 2019 (JP) .................................. 2019-137540

(51) Int. Cl.
*B23K 35/38*  (2006.01)
*B23K 35/28*  (2006.01)
(Continued)

(52) U.S. Cl.
CPC ........ *B23K 35/286* (2013.01); *B23K 35/0238* (2013.01); *B32B 15/016* (2013.01);
(Continued)

(58) Field of Classification Search
None
See application file for complete search history.

(56) References Cited

U.S. PATENT DOCUMENTS 11,491,586 B2 * 11/2022 Yamayoshi ............... C22F 1/04
2010/0263768 A1  10/2010 Hisatomi et al.
(Continued)

FOREIGN PATENT DOCUMENTS

CN         105814219 A    7/2016
JP         2004-358519 A  12/2004
(Continued)

OTHER PUBLICATIONS

Office Action dated Nov. 18, 2022, issued in counterpart CN Application No. 202080055553.0, with English Translation. (14 pages).
International Search Report dated Sep. 24, 2020, issued in counterpart International Application No. PCT/JP2020/026324 (3 pages).

*Primary Examiner* — Daniel J. Schleis
(74) *Attorney, Agent, or Firm* — WHDA, LLP

(57) ABSTRACT

An aluminum alloy brazing sheet is formed of a four-layer material formed of a brazing material, an intermediate material, a core material, and a brazing material. The intermediate material comprises Mg of 0.40 to 6.00 mass %, and has a total of contents of Mn, Cr, and Zr being 0.10 mass % or more. The core material comprises Mg of 0.20 to 2.00 mass % and comprises one or two or more of Mn of 1.80 mass % or less, Si of 1.05 mass % or less, Fe of 1.00 mass % or less, Cu of 1.20 mass % or less, Ti of 0.30 mass % or less, Zr of 0.30 mass % or less, and Cr of 0.30 mass % or (Continued)

less. Each of the core material and the intermediate material has a grain size of 20 to 300 μm.

10 Claims, 1 Drawing Sheet

(51) Int. Cl.
  *B23K 35/02* (2006.01)
  *B32B 15/01* (2006.01)
  *C22C 21/02* (2006.01)
  *C22C 21/08* (2006.01)
  *C22F 1/043* (2006.01)
  *C22F 1/047* (2006.01)

(52) U.S. Cl.
  CPC .............. *C22C 21/02* (2013.01); *C22C 21/08* (2013.01); *C22F 1/043* (2013.01); *C22F 1/047* (2013.01)

(56) References Cited

U.S. PATENT DOCUMENTS

| 2015/0118517 A1 | 4/2015 | Itoh et al. |
| 2019/0184501 A1 | 6/2019 | Fukumoto et al. |
| 2019/0291218 A1 | 9/2019 | Itoh et al. |

FOREIGN PATENT DOCUMENTS

| JP | 2007-182602 A | 7/2007 |
| JP | 4547032 B1 | 9/2010 |
| JP | 2010-255013 A | 11/2010 |
| JP | 2012-55895 A | 3/2012 |
| JP | 2013-215797 A | 10/2013 |
| JP | 2013-233552 A | 11/2013 |
| WO | 2017/208940 A1 | 12/2017 |
| WO | 2018/043277 A1 | 3/2018 |
| WO | 2020/085485 A1 | 4/2020 |
| WO | 2020/085486 A1 | 4/2020 |

* cited by examiner

ALUMINUM ALLOY BRAZING SHEET AND MANUFACTURING METHOD THEREOF

TECHNICAL FIELD

The present invention relates to an aluminum alloy brazing sheet used for brazing an aluminum material in an inert gas atmosphere or in vacuum without using a flux.

BACKGROUND ART

Brazing joint is widely used as a method for joining products including, a number of minute joining portions, such as heat exchangers and machine components formed aluminum. To execute brazing joint for aluminum materials (including aluminum alloy materials), it is indispensable to break an oxide film covering the surface of the material and bring the molten brazing material into contact with a base material or a similarly molten brazing material. Methods for breaking the oxide film of the aluminum material are broadly divided into methods of using a flux and methods of heating the material in vacuum, and both of them have been put to practical use.

Brazing joint has a wide application range. Heat exchangers for automobiles serve as the most representative product manufactured by brazing joint. Most of heat exchangers for automobiles, such as radiators, heaters, condensers, and evaporators, are formed of aluminum, and most of them are manufactured by brazing joint. A method of applying a noncorrosive flux and heating the structure in nitrogen gas occupies the majority part of brazing joint at present.

However, in a flux brazing method, the cost for the flux and the cost required for the step of applying the flux increase, and serve as the cause for increase in cost for manufacturing heat exchangers. There is a method of manufacturing heat exchangers by vacuum brazing, but the vacuum brazing method requires high equipment cost and high maintenance cost for the heating furnace, and has the problem in productivity and/or brazing stability. For this reason, there are increasing needs for executing brazing joint in a nitrogen gas furnace without using a flax.

To meet the needs, for example, Patent Literature 1 proposes a method of diffusing Mg added to the core material into the brazing material, as a method enabling brazing joint in an inert gas atmosphere without using a flux by diffusing Mg unto the brazing material during brazing heating. Patent Literature 1 discloses that the method prevents formation of an oxide film on the surface of the brazing material in manufacturing of the clad material and/or during brazing heating, and that Mg effectively acts on breakage of an oxide film on the surface of the brazing material.

In addition, for example, Patent Literature 2 proposes a method of providing an intermediate material between a brazing material comprising Li and a core material comprising Mg, and including Mg in the intermediate material. Patent Literature 2 discloses that an oxide film on a surface of the brazing material is broken during brazing heating with Li added to the brazing material and Mg added to the core material and the intermediate material, and brazing is enabled in an inert gas atmosphere without using a flux.

By contrast, Patent Literature 3 discloses that Mg effectively acts in breakage of an oxide film on the surface of the brazing material by adding Mg also to the brazing material, executing intermediate annealing and/or final annealing in an atmosphere having oxygen concentration lower than oxygen concentration in the atmosphere, cooling the structure to 200° C. or less in the atmosphere, and controlling the thickness of the surface oxide film before brazing at 150 Å or less.

In addition, Patent literatures 4 and 5 disclose that good flux-free brazability is acquired by controlling the equivalent circle diameter and the number of Si particles included in the brazing material, and bringing the brazing material into close contact with the brazing target material.

PRIOR ART LITERATURES

Patent Literatures

PATENT LITERATURE 1: Japanese Patent Publication No. 2004-358519-A
PATENT LITERATURE 2: Japanese Patent Publication No. 2013-233552-A
PATENT LITERATURE 3: Japanese Patent Publication No. 2013-215797-A
PATENT LITERATURE 4: Japanese Patent No. 4547032
PATENT LITERATURE 5: Japanese Patent Publication No. 2012-55895-A

SUMMARY OF INVENTION

Problem to be Solved by Invention

However, the method of diffusing Mg added to the core material into the brazing material requires securing the solidus temperature of the core material equal to or more than the brazing temperature, and the Mg quantity that can be added to the core material is limited. For this reason, there are cases where no sufficient Mg quantity to break the oxide film in brazing can be added and good brazability cannot be secured.

In addition, even when the Mg quantity of the core material is limited, in the case where the grain size of the core material is small, there is the problem that the shape of the heat exchanger cannot be maintained because, for example, the core material is molten due to much diffusion of Si in the brazing material into the core material iii brazing, or the core material is molten due to much diffusion of Si in the brazing material into the core material as a result of remaining subgrains in a low-processed portion at the time when pressing or the like is executed in brazing.

In addition, in the method of providing an intermediate material between a brazing material comprising Li and a core material comprising Mg and including Mg in the intermediate material, the Mg addition quantity to the intermediate material is not limited because the intermediate material is provided. However, there is the possibility that Mg is not sufficiently diffused and no sufficient film breaking effect is acquired, in the case where, for example, the brazing material is thick or under the condition in which the temperature increase speed in brazing is high.

By contrast, when Mg is added also to the brazing material, control of intermediate annealing and/or final annealing is required. In addition, this case has the problem that Mg added to the brazing material is diffused into the surface of the brazing material in brazing heating to form a MgO oxide film, and the brazability decreases when the oxide film formation quantity is large.

In addition, in the case of controlling the equivalent circle diameter and the number of Si particles included in the brazing material and bringing the brazing material into close contact with the brazing target material, there is the problem of decrease in brazability in for example, an ordinary bonded joint having a minute clearance exceeding 0.3 μm between the structure and the close contact part.

Accordingly, an object of the present invention is to provide an aluminum alloy brazing sheet achieving excellent brazability. With the aluminum alloy brazing sheet, in the case of brazing an aluminum material in an inert gas atmosphere, such as a nitrogen gas atmosphere, or in vacuum without using a flux, diffusion of Mg in the core material into the surface of the brazing material is suppressed in brazing heating, and, when the brazing material comprises Mg, diffusion of Mg in the core material and Mg in the brazing material into the surface of the brazing material is suppressed. After melting of the brazing material is started, Mg added to the brazing material and Mg diffused into the brazing material from the core material are sufficiently eluted into the molten brazing material. This structure enables efficient breakage of the oxide film on the surface of the brazing material, and suppresses diffusion of Si in the brazing material into the core material in brazing heating.

Means for Solving Problem

The problem described above is solved with the present invention described hereinafter.

Specifically, the present invention (1) provides an aluminum alloy brazing sheet used for brazing of an aluminum material in an inert gas atmosphere or in vacuum and
  formed of a four-layer material in which a brazing material, an intermediate material, a core material, and a brazing material are stacked in this order,
  the intermediate material being formed of an aluminum alloy and having a gain size of 20 to 300 μm, the aluminum alloy comprising Mg of 0.40 to 6.00 mass % with the balance being aluminum and inevitable impurities,
  the core material being formed of an aluminum alloy and having a grain size of 20 to 300 μm, the aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.2 mass % or less, Ti of 0.30 mass % or less, Zr of 0.30 mass % or less, and Cr of 0.30 mass % or less, with the balance being aluminum and inevitable impurities,
  each of the brazing materials being formed of an aluminum alloy comprising Si of 4.00 to 13.00 mass % and further comprising one or two or more of Mn of 2.00 mass or less. Ti of 0.30 mass % or less, Zr of 0.30 mass % or less, and Cr of 0.30 mass % or less, with the balance being aluminum and inevitable impurities, and
  in a drop-type fluidity test, a ratio α ($\alpha = K_a/K_b$) of a fluid coefficient $K_a$ after a 5% strain is applied to a fluid coefficient $K_b$ before the strain is applied being 0.55 or more.

The present invention (2) provides the aluminum alloy brazing sheet of (1), wherein the intermediate material further comprises Zn of 8.00 mass % or less.

The present invention (3) provides the aluminum alloy brazing sheet of (1) or (2), wherein the intermediate material further comprises one or two or more of Mn of 2.00 mass % or less, Cu of 1.20 mass % or less, Cr of 0.30 mass % or less, and Zr of 0.30 mass or less, and a total of contents of Mn, Cr, and Zr is 0.10 mass % or more.

The present invention (4) provides the aluminum alloy brazing sheet of any one of (1) to (3), wherein each of the brazing materials further comprises Bi of 1.00 mass % or less.

The present invention (5) provides the aluminum alloy brazing sheet of any one of (1) to (4), wherein each of the brazing materials further comprises one or two or more of Na of 0.050 mass % or less, Sr of 0.050 mass % or less, and Sb of 0.050 mass % or less.

The present invention (6) provides the aluminum alloy brazing sheet of any one of (1) to (5), wherein each of the brazing materials further comprises Mg of 2.00 mass or less.

The present invention (7) provides the aluminum alloy brazing sheet of any one of (1) to (6), wherein each of the brazing materials further comprises one or two or more of Zn of 8.00 mass % or less, In of 0.100 mass % or less, Sn of 0.100 mass % or less, and Cu of 4.0 mass % or less.

The present invention (8) provides the aluminum alloy brazing sheet of any one of (1) to (7), wherein the intermediate material further comprises Si of 13.00 mass % or less.

The present invention (9) provides the aluminum alloy brazing sheet of any one of (1) to (8), wherein the intermediate material further comprises Bi of 1.00 mass % less.

The present invention (10) provides the aluminum alloy brazing sheet of any one of (1) to (9), wherein the intermediate material further comprises one or two of In of 0.100 mass % or less and Sn of 0.100 mass % or less.

The present invention (11) provides the aluminum alloy brazing sheet of any one of (1) to (10), wherein the intermediate material further comprises Fe of 1.00 mass % or less.

The present invention (12) provides the aluminum alloy brazing sheet of any one of (1) to (11), wherein each of the brazing materials further comprises Fe of 1.00 mass % or less.

The present invention (13) provides an aluminum alloy brazing sheet used for brazing of an aluminum material in an inert gas atmosphere or in vacuum and
  formed of a five-layer material in which a brazing material, an intermediate material, a core material, an intermediate material, and a brazing material are stacked in this order,
  each of the intermediate materials being formed of an aluminum alloy and having a grain size of 20 to 300 μm, the aluminum alloy comprising Mg of 0.40 to 6.00 mass % with the balance being aluminum and inevitable impurities,
  the core material being formed of an aluminum alloy and having a grain size of 20 to 300 μm, the aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
  each of the brazing materials being formed of an aluminum alloy comprising Si of 4.00 to 13.00 mass % and further comprising one or two or more of Mn of 2.00 mass or less, Ti of 0.30 mass % or less, Zr of 0.30 mass % or less, and Cr of 0.30 mass % or less, with the balance being aluminum and inevitable impurities, and
  in a drop-type fluidity test, a ratio α ($\alpha = K_a/K_b$) of a fluid coefficient $K_a$ after a 5% strain is applied to a fluid coefficient $K_b$ before the strain is applied being 0.55 or more.

The present invention (14) provides the aluminum alloy brazing sheet of (13), wherein the intermediate material further comprises Zn of 8.00 mass % or less.

The present invention (15) provides the aluminum alloy brazing sheet of (13) or (14), wherein each of the intermediate materials further comprises one or two or more of Mn of 2.00 mass % or less, Cu of 1.20 mass % or less, Cr of 0.30 mass % or less, and Zr of 0.30 mass % or less, and a total of contents of Mn, Cr, and Zr is 0.10 mass % or more.

The present invention (16) provides the aluminum alloy brazing sheet of any one of (13) to (15), wherein each of the brazing materials further comprises Bi of 1.00 mass % or less.

The present invention (17) provides the aluminum alloy brazing sheet of any one of (13) to (16), wherein each of the brazing materials further comprises one or two or more of Na of 0.050 mass % or less, Sr of 0.050 mass % or less, and Sb of 0.050 mass % or less.

The present invention (18) provides the aluminum alloy brazing sheet of any one of (13) to (17), wherein each of the brazing materials further comprises Mg of 2.00 mass % or less.

The present invention (19) provides the aluminum alloy brazing sheet of any one of (13) to (18), wherein each of the brazing materials further comprises one or two or more of Zn of 8.00 mass % or less, In of 0.100 mass % or less, Sn of 0.100 mass % or less, and Cu of 4.00 mass % or less.

The present invention (20) provides the aluminum alloy brazing sheet of any one of (13) to (19), wherein each of the intermediate materials farther comprises Si of 13.00 mass % or less.

The present invention (21) provides the aluminum alloy brazing sheet of any one of (13) to (20), wherein each of the intermediate materials further comprises Bi of 1.00 mass % or less.

The present invention (22) provides the aluminum alloy brazing sheet of any one of (13) to (21), wherein each of the intermediate materials further comprises one or two of In of 0.100 mass % or less and Sn of 0.100 mass % or less.

The present invention (23) provides the aluminum alloy brazing sheet of any one of (13) to (22), wherein each of the intermediate materials further comprises Fe of 1.00 mass % or less.

The present invention (24) provides the aluminum alloy brazing sheet of any one of (13) to (23), wherein each of the brazing materials further comprises Fe of 1.00 mass % or less.

The present invention (25) provides a method for manufacturing the aluminum alloy brazing sheet of any one of (1) to (12), the method comprising executing at least hot working, cold working, one or more intermediate annealings between rolling passes in the cold working, and final annealing after the last pass of the cold working on a stacked structure acquired by stacking a brazing material ingot, an intermediate material ingot, a core material ingot, and a brazing material ingot in this order to acquire the aluminum alloy brazing sheet, wherein the intermediate material ingot is formed of an aluminum alloy comprising Mg of 0.40 to 6.00 mass % with the balance being aluminum and inevitable impurities, the core material ingot is formed of an aluminum alloy comprising Mg of 0.20 to 2.00 mass and further comprising one or two or more of Mn of 1.80 mass % or less. Si of 1.50 mass % or less, Fe of 1.0 mass % or less, Cu of 1.20 mass % or less, Ti of 0.30 mass % or less, Zr of 0.30 mass % or less, and Cr of 0.30 mass % or less, with the balance being aluminum and inevitable impurities, each of the brazing material ingots is formed of an aluminum alloy comprising Si of 4.00 to 13.00 mass % with the balance being aluminum and inevitable impurities, and a working ratio (working ratio=$((t_a-t_b)/t_a) \times 100$) of a thickness $t_b$ before the final annealing to a thickness after the last intermediate annealing among the intermediate annealings is 20 to 70%.

The present invention (26) provides the method for manufacturing the aluminum alloy brazing sheet of (25), wherein the intermediate material ingot further comprise Zn of 8.00 mass % or less.

The present invention (27) provides the method for manufacturing the aluminum alloy brazing sheet of (25) or (26), wherein the intermediate material ingot further comprises one or two or more of Mn of 2.00 mass % or less, Cu of 1.20 mass a or less, Cr of 0.30 mass n or less, and Zr of 0.30 mass n or less, and a total of contents of Mn, Cr, and Zr is 0.10 mass % or more.

The present invention (28) provides the method for manufacturing the aluminum alloy brazing sheet of any one of (25) to (27), wherein each of the brazing material ingots further comprises Bi of 1.00 mass % or less.

The present invention (29) provides the method for manufacturing the aluminum alloy brazing sheet of any one of (25) to (28), wherein each of the brazing material ingots further comprises one or two or more of Na of 0.050 mass % or less, Sr of 0.050 mass % or less, and Sb of 0.050 mass a or less.

The present invention (30) provides the method for manufacturing the aluminum alloy brazing sheet of any one of (25) to (29), wherein each of the brazing material ingots further comprises Mg of 2.00 mass % or less.

The present invention (31) provides the method for manufacturing the aluminum alloy brazing sheet of any one of (25) to (30), wherein each of the brazing material ingots further comprises one or two or more of Zn of 8.00 mass % or less, In of 0.100 mass % or less, Sn of 0.100 mass % or less, and Cu of 4.00 mass % or less.

The present invention (32) provides the method for manufacturing the aluminum alloy brazing sheet any one of (25) to (31), wherein the intermediate material ingot further comprises Si of 13.00 mass % or less.

The present invention (33) provides the method for manufacturing the aluminum alloy brazing sheet of any one of (25) to (32), wherein the intermediate material ingot further comprises Bi of 1.00 mass % or less.

The present invention (34) provides the method for manufacturing the aluminum alloy brazing sheet of any one of (25) to (33), wherein the intermediate material ingot further comprises one or two of In of 0.100 mass % or less and Sn of 0.100 mass % or less.

The present invention (35) provides the method for manufacturing the aluminum alloy brazing sheet of any one of (25) to (34), wherein the intermediate material ingot further comprises Fe of 1.00 mass % or less.

The present invention (36) provides the method for manufacturing the aluminum alloy brazing sheet of any one of (25) to (35), wherein each of the brazing material ingots further comprises Fe of 1.00 mass % or less.

The present invention (37) provides a method for manufacturing the aluminum alloy brazing sheet of any one of (13) to (24), the method comprising executing at least hot working, cold working, one or more intermediate annealings between rolling passes in the cold working, and final annealing after the last pass of the cold working on a stacked structure acquired by stacking a brazing material ingot, an intermediate material ingot, a core material ingot, an intermediate material ingot, and a brazing material ingot in this order to acquire the aluminum alloy brazing sheet, wherein
  each of the intermediate material ingots is formed of an aluminum alloy comprising Mg of 0.40 to 6.00 mass % with the balance being aluminum and inevitable impurities,
  the core material ingot is formed of an aluminum alloy comprising Mg of 0.20 to 2.00 mass % and further comprising one or two or more of Mn of 1.80 mass % or less. Si of 1.50 mass % or less, Fe of 1.00 mass % or less, Cu of 1.20 mass % less, Ti of 0.30 mass % or less, a of 0.30 mass % or less, and Cr of 0.30 mass % or less, with the balance being aluminum and inevitable impurities,
  each of the brazing material ingots is formed of an aluminum alloy comprising Si of 4.00 to 13.00 mass % and further comprising one or two Or more of Mn of 2.00 mass % or less, Ti of 0.30 mass % or less, Zr of 0.30 mass % or less, and Cr of 0.30 mass % or less, with the balance being aluminum and inevitable impurities, and
  a working ratio (working ratio=$((t_a-t_b)\times 100)$) of a thickness $t_b$ before the final annealing to a thickness $t_a$ after the last intermediate annealing among the intermediate annealings is 20 to 70%.

The present invention (38) provides the method for manufacturing the aluminum alloy brazing sheet of (37), wherein each of the intermediate material ingots further comprise Zn of 8.00 mass % or less.

The present invention (39) provides the method for manufacturing the aluminum alloy brazing sheet of (37) or (38), wherein each of the intermediate material ingots further comprises one or two or more of Mn of 2.00 mass % or less, Cu of 1.20 mass % or less, Cr of 0.30 mass % or less, and Zr of 0.30 mass % or less, and a total of contents of Mn, Cr, and Zr is 0.10 mass % or more.

The present invention (40) provides the method for manufacturing the aluminum alloy brazing sheet of any one of (37) to (39), wherein each of the brazing material ingots further comprises Si of 1.00 mass % or less.

The present invention (41) provides the method for manufacturing the aluminum alloy brazing sheet of any one of (37) to (40), wherein each of the brazing material ingots further comprises one or two or more of Na of 0.050 mass % or less, Sr of 0.050 mass % or less, and Sb of 0.050 mass % or less.

The present invention (42) provides the method for manufacturing the aluminum alloy brazing sheet of any one of (37) to (41), wherein each of the brazing material ingots further comprises Mg of 2.00 mass % or less.

The present invention (43) provides the method for manufacturing the aluminum alloy brazing sheet of any one of (37) to (42), wherein each of the brazing material ingots further comprises one or two or more of Zn of 8.00 mass % or less, In of 0.100 mass or less, Sn of 0.100 mass % or less, and Cu of 4.00 mass % or less.

The present invention (44) provides the method for manufacturing the aluminum alloy brazing sheet of any one of (37) to (43), wherein each of the intermediate material ingots further comprises Si of 13.00 mass % or less.

The present invention (45) provides the method for manufacturing the aluminum alloy brazing sheet of any one of (37) to (44), wherein each of the intermediate material ingots further comprises Bi of 1.00 mass % or less.

The present invention (46) provides the method for manufacturing the aluminum alloy brazing sheet of any one of (37) to (45), wherein each of the intermediate material ingots further comprises one or two of In of 0.100 mass % or less and Sn of 0.100 mass % or less.

The present invention (47) provides the method for manufacturing the aluminum alloy brazing sheet of any one of (37) to (46), wherein each of the intermediate material ingots further comprises Fe of 1.00 mass % or less.

The present invention (48) provides the method for manufacturing the aluminum alloy brazing sheet of any one of (37) to (47), wherein each of the brazing material ingots further comprises Fe of 1.00 mass % or less.

Effects of Invention

The present invention provides an aluminum alloy brazing sheet achieving excellent brazability. In the case of brazing an aluminum material in an inert gas atmosphere, such as a nitrogen gas atmosphere, or in vacuum without using a flux, diffusion of Mg in the core material into the surface of the brazing material is suppressed in brazing heating, and, when the brazing material comprises Mg, diffusion of Mg in the core material and Mg in the brazing material into the surface of the brazing material is suppressed. After melting of the brazing material is started, Mg added to the brazing material and Mg diffused into the brazing material from the core material are sufficiently eluted into the molten brazing material. This structure enables efficient breakage of the oxide film on the surface of the brazing material, and suppresses diffusion of Si in the brazing material into the core material in brazing heating.

EMBODIMENTS OF INVENTION

Figure 1:
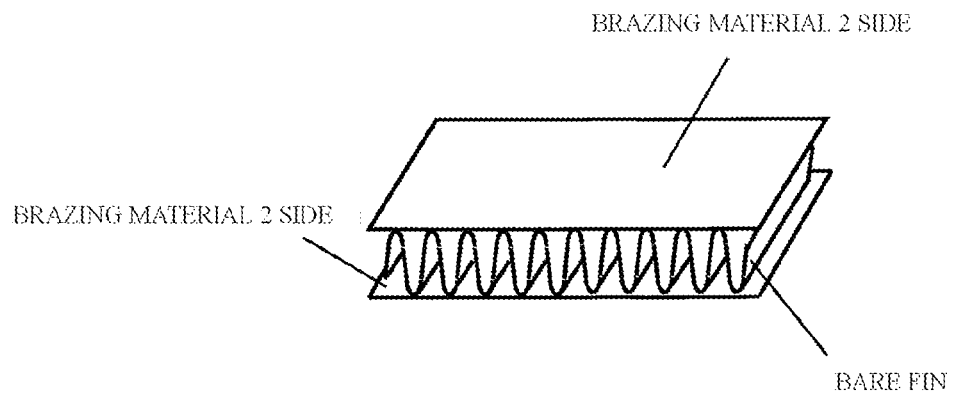
FIG. 1 is a diagram illustrating a miniature core prepared in an example.

The aluminum alloy brazing sheet according to a first embodiment of the present invention is an aluminum alloy brazing sheet used for brazing of an aluminum material in an inert gas atmosphere or in vacuum and
  formed of a four-layer material in which a brazing material, an intermediate material, a core material, and a brazing material are stacked in this order,
  the intermediate material being formed of an aluminum alloy and having a grain size of 20 to 300 μm, the aluminum alloy comprising Mg of 0.40 to 6.00 mass % with the balance being aluminum and inevitable impurities,
  the core material being formed of an aluminum alloy and having a grain size of 20 to 300 μm, the aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr 0.30 mass % or less, and Cr of 0.30 mass % or less, with the balance being aluminum and inevitable impurities.

each of the brazing materials being formed of an aluminum alloy comprising Si of 4.00 to 13.00 mass % and further comprising one or two or more of Mn of 7.00 mass or less, Ti of 0.30 mass % or less, Zr of 0.30 mass % or less, and Cr of 0.30 mass % or less, with the balance being aluminum and inevitable impurities, and in a drop-type fluidity test, a ratio α ($\alpha = K_a/K_b$) of a fluid coefficient $K_a$ after a 5% strain is applied to a fluid coefficient $K_b$ before the strain is applied being 0.55 or more.

The aluminum alloy brazing sheet according to the first embodiment of the present invention is formed of a four-layer material in which a brazing material 1, an intermediate material 1, a core material, and a brazing material 2 are stacked and cladded in the order of brazing material 1/intermediate material 1/core material/brazing material 2. Specifically, the aluminum alloy brazing sheet according to the present invention is a clad material in which the brazing material 1 and the intermediate material 1 are cladded onto one side surface of the core material in the order of "intermediate material 1/brazing material 1" from the core material side, and the brazing material 2 is cladded onto the other side surface of the core material. In the aluminum alloy brazing sheet according to the first embodiment of the present invention, the chemical composition of the brazing material 1 may be the same as, or different from, the chemical composition of the brazing material 2.

The intermediate material of the aluminum alloy clad material according to the first embodiment of the present invention is formed of an aluminum alloy comprising Mg of 0.40 to 6.00 mass % with the balance being aluminum and inevitable impurities.

The intermediate material comprises Mg. Because Mg has lower free energy of oxide formation than that of aluminum, Mg included in the intermediate material is diffused into the brazing material in brazing heating to break the oxide film of aluminum covering the surface of the brazing material. The Mg content in the intermediate material is 0.40 to 6.00 mass %, preferably 1.30 to 5.00 mass %, and particularly preferably 2.50 to 4.00 mass %. The Mg content in the intermediate material falling within the range described above causes breakage of the oxide film after melting of the brazing material, and good brazability is achieved. By contrast, when the Mg content in the intermediate material is less than the range described above, the Mg quantity diffused and eluted into the brazing material becomes insufficient, and the effect of breaking the oxide film on the surface of the brazing material becomes insufficient. In addition, the Mg content exceeding the range described above easily causes cracks in manufacturing of the material, and causes difficulty in manufacturing of the brazing sheet.

The intermediate material may further comprise Zn. Zn included in the intermediate material lowers the solidus temperature of the intermediate material, and increases the supply speed of Mg to the brazing material. Zn included in the intermediate material also has the effect of setting the potential less-noble, and exhibits the sacrificial anticorrosion effect by forming a difference in potential between the intermediate material and the core material. When the intermediate material comprises Zn, the Zn content in the intermediate material is 8.00 mass % or less and preferably 3.50 mass % or less. When the Zn content in the intermediate material exceeds the range described above, because the self-corrosion resistance lowers, the material is worn early, and no sufficient anticorrosion effect is exhibited.

The intermediate material may further comprise one or two or more of Mn, Cu, Cr, and Zr. Because Mn and Cu have the effect of increasing the deformation resistance at high temperature, the effect of increasing the deformation resistance of the intermediate material in cladding in hot rolling and reducing fluctuations in clad ratio can be obtained. Cr and Zr are added to adjust the grain size of the intermediate material. The intermediate material may further comprise one or two or more of Mn of 2.00 mass or less, Cu of 1.20 mass % or less, Cr of 0.30 mass % or less, and Zr of 0.30 mass % or less. When the intermediate material comprises Mn, the Mn content in the intermediate material is 2.00 mass n or less, preferably 0.10 to 2.00 mass %, and particularly preferably 0.60 to 1.50 mass %. When the Mn content in the intermediate material exceeds the range described above, giant intermetallic compounds are easily generated in casting and the plastic workability is reduced. When the intermediate material comprises Cu, the Cu content in the intermediate material is 1.20 mass % or less and preferably 0.05 to 1.00 mass %. When the Cu content in the intermediate material exceeds the range described above, the possibility of occurrence of grain boundary corrosion increases. When the intermediate material comprises Cr, the Cr content in the intermediate material is 0.30 mass % or less, preferably 0.05 to 0.30 mass %, and particularly preferably 0.10 to 0.20 mass %. When the Cr content in the intermediate material exceeds the range described above, giant intermetallic compounds are easily generated in casting and the plastic workability is reduced. When the intermediate material comprises Zr, the Zr content in the intermediate material is 0.30 mass % or less, preferably 0.05 to 0.30 mass %, and particularly preferably 0.10 to 0.20 mass %. When the Zr content in the intermediate material exceeds the range described above, giant intermetallic compounds are easily generated in casting and the plastic workability is reduced.

When the intermediate material comprises one or two or more of Mn, Cr, and Zr, the total of contents of Mn, Cr, and Zr is 0.10 mass % or more, preferably 0.40 to 2.00 mass %, and particularly preferably 1.00 to 1.50 mass %. Excellent hot rollability and excellent plastic workability are achieved, with the total contents of Mn, Cr, and Zr in the intermediate material falling within the range described above.

The intermediate material may further comprise Si. The intermediate material comprising Si lowers the solidus temperature of the intermediate material. With this structure, a liquid phase is generated in a temperature range in which the brazing material is molten, some of the intermediate material is molten, and the supply speed of Mg to the brazing material described above increases. In addition, the intermediate material comprising Si may function as the brazing material. When the intermediate material comprises Si, the Si content in the intermediate material is 13.00 mass % or less and preferably 1.00 to 13.00 mass %. When the Si content in the intermediate material exceeds the range described above, coarse proeutectic Si are easily formed in casting, cracks easily occur in manufacturing of the material, and the plastic workability is reduced. The intermediate material may comprise Si of 0.05 to 1.00 mass %.

The intermediate material may comprise Fe of 1.00 mass % or less and preferably 0.05 to 0.50 mass %

The intermediate material may further comprise Bi. Bi included in the intermediate material promotes breakage of the oxide film with Mg supplied from the intermediate material and/or the core material to the brazing material in brazing, heating, and improves the brazability. When the intermediate material comprises Bi, the Bi content in the intermediate material is 1.00 mass % or less, preferably 0.004 to 0.50 mass %, and particularly preferably 0.10 to 0.50 mass %. The Bi content in the intermediate material exceeding the range described above easily causes cracks in rolling of the material, and causes difficulty in manufacturing of the brazing sheet.

The intermediate material may further comprise one or two of hi and Sn. When the intermediate material comprises In, the In content in the intermediate material is 0.100 mass % or less and preferably 0.010 to 0.050 mass %. When the intermediate material comprises Sn, the Sn content in the intermediate material is 0.100 mass % or less and preferably 0.010 to 0.100 mass %.

The core material of the aluminum alloy brazing sheet according to the first embodiment of the present invention is formed of an aluminum alloy comprising Mg of 0.20 to 2.00 mass % and
further comprises one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less,
with the balance being aluminum and inevitable impurities.

The core material comprises Mg. Mg included in the core material is dissolved into the matrix to improve the material strength by solid solution strengthening. Mg included in the core material reacts with Si to exhibit the effect of increasing strength caused by age precipitation of a $Mg_2Si$ compound. In addition, because Mg has lower free energy of oxide formation than that of aluminum, Mg included in the core material is diffused into the brazing material in brazing heating to break the oxide film of aluminum covering the surface of the brazing material. The Mg content in the core material is 0.20 to 2.00 mass %, preferably 0.50 to 1.50 mass %, and particularly preferably 0.50 to 1.00 mass %. When the Mg content in the core material is less than the range described above, the Mg quantity diffused and eluted into the brazing material becomes insufficient, and the effect of breaking the oxide film on the surface of the brazing material becomes insufficient. The Mg content exceeding the range described above lowers the solidus temperature (inciting point) of the core material, and increases the possibility of causing melting of the core material in brazing.

The core material comprises one or two or more of Mn, Si, Fe, Cu, Ti, Zr, and Cr.

Mn included in the core material forms Al—Fe—Mn based, Al—Mn—Si based, and Al—Fe—Mn—Si based intermetallic compounds together with Fe and Si, and acts to achieve dispersion strengthening, or is dissolved into the matrix to improve the material strength by solid solution strengthening. Mn included in the core material also exhibits the effect of setting the potential noble to increase the difference in potential from the sacrificial anode material and/or the fin so as to improve the anticorrosion effect by the sacrificial anode effect. The Mn content in the core material is 1.80 mass % or less and preferably 0.60 to 1.50 mass %. When the Mn content in the core material exceeds the range described above, giant intermetallic compounds are easily generated in casting and the plastic workability is reduced.

Si included in the core material forms Al—Mn—Si based, Al—Fe—Si based, and Al—Fe—Mn—Si based intermetallic compounds together with Fe and Mn, and acts to achieve dispersion strengthening, or is dissolved into the matrix to improve the material strength by solid solution strengthening. In addition, Si included in the core material reacts with Mg to exhibit the effect for strength improvement by age precipitation of the $Mg_2Si$ compound. When the core material comprises Si, the Si content in the core material is 1.50 mass % or less, preferably 0.05 to 1.00 mass %, and particularly preferably 0.20 to 1.00 mass %. The Si content in the core material exceeding the range described above lowers the solidus temperature (melting point) of the core material, and increases the possibility of causing melting of the core material in brazing.

Fe included in the core material forms Al—Fe—Mn based, Al—Fe—Si based, and Al—Fe—Mn—Si based intermetallic compounds together with Mn and Si, acts to achieve dispersion strengthening, and improves the material strength. When the core material comprises Fe, the Fe content in the core material is 1.00 mass % or less and preferably 0.05 to 0.70 mass %. When the Fe content in the core material exceeds the range described above, giant intermetallic compounds are easily generated in casting and the plastic workability is reduced.

Cu included in the core material improves the material strength by solid solution strengthening Cu included in the core material also exhibits the effect of setting the potential noble to increase the difference in potential from the sacrificial anode material and/or the fin so as to improve the anticorrosion effect by the sacrificial anode effect. When the core material comprises Cu, the Cu content in the core material is 1.20 mass % or less and preferably 0.05 to 1.00 mass %. The Cu content in the core material exceeding the range described above increases the possibility of occurrence of intergranular corrosion, and increases the possibility of melting of the core material due to decrease in melting point thereof.

Ti included in the core material has the effect of improving strength by solid solution strengthening, and improving corrosion resistance. When the core material comprises Ti, the Ti content in the core material is 0.30 mass % or less and preferably 0.10 to 0.20 mass %. When the Ti content in the core material exceeds the range described above, giant intermetallic compounds are easily generated in casting and the plastic workability is reduced.

Zr included in the core material improves strength by solid solution strengthening, and precipitates Al—Zr based minute compounds to act on grain coarsening after brazing. When the core material comprises Zr, the Zr content in the core material is 0.30 mass % or less and preferably 0.10 to 0.20 mass %. When the Zr content in the core material exceeds the range described above, giant intermetallic compounds are easily formed in casting, and plastic workability is reduced.

Cr included in the core material improves strength by solid solution strengthening, and precipitates Al—Cr based minute compounds to act on grain coarsening after brazing. When the core material comprises Cr, the Cr content in the core material is 0.30 mass % or less and preferably 0.10 to 0.20 mass %. When the Cr content in the core material exceeds the range described above, giant intermetallic compounds are easily formed in casting, and plastic workability is reduced.

The grain size of the core material is 20 to 300 μm and preferably 50 to 200 μm, and the grain size of the intermediate material is 20 to 300 μm and preferably 50 to 200 μm. With the grain sizes of the core material and the intermediate material falling within the range described above, excellent brazability is achieved. When the grain sizes of the core material and the intermediate material are small, Si included in the brazing material on the side directly cladded onto the core material or the intermediate material is easily diffused in the vicinity of the grain boundary of the core material or the intermediate material. This structure decreases the brazing material quantity and lowers the brazability. Large grain sizes of the core material and the intermediate material suppress the diffusion quantity of Si. The grain sizes of the core material and the intermediate material less than the range described above lower the brazability. The grain size exceeding the range described above causes a rough surface when the aluminum alloy brazing sheet is subjected to plastic working. The grain sizes of the core material and the intermediate material can be set to the range described above by setting the working ratio (working ratio=$((t_a-t_b)/t_a) \times 100$) of a thickness $t_b$ before the final annealing to a thickness $t_a$ after the last intermediate annealing among intermediate annealings executed between passes of cold working to 20 to 70%, in the manufacturing process of the aluminum alloy brazing sheet.

Each of the brazing materials (brazing material 1 and brazing material 2) of the aluminum alloy brazing sheet according to the first embodiment of the present invention is formed of an aluminum alloy comprising
Si of 4.00 to 13.00 mass %, and
one or two or more of Mn of 2.00 mass % or less, Ti of 0.30 mass % or less, Zr of 0.30 mass % or less, and Cr of 0.30 mass % or less,
with the balance being aluminum and inevitable impurities. In the aluminum alloy brazing sheet according to the present invention, the chemical composition of the brazing material 1 may be the same as, or different from, the chemical composition of the brazing material 2.

The Si content in the brazing material is 4.00 to 13.00 mass %. When the Si content in the brazing material is less than the range described above, no sufficient brazability is acquired. The Si content exceeding the range described above causes easy formation of coarse proeutectic Si in casting, causes easy occurrence of cracks in manufacturing of the material, and lowers plastic workability.

Each of the brazing materials further comprises one or two or more of Mn, Ti, Zr, and Cr. Mn, Ti. Zr, and/or Cr included in the brazing material coarsen the grain size of the brazing material, suppress the diffusion quantity of Mg in the brazing material into the surface of the brazing Material though the grain boundary of the brazing material as a path in brazing heating and the diffusion quantity of Mg in the core material into the brazing material and further into the surface of the brazing material through the grain boundary of the brazing material as a path, and suppress generation of a MgO oxide film on the surface of the brazing material to improve brazability. When the brazing material comprises Mn, the Mn content in the brazing material is 2.00 mass %, preferably 0.10 to 0.60 mass %. When the brazing material comprises Ti, the Ti content in the brazing material is 0.30 mass % or less, preferably 0.05 to 0.10 mass %. When the brazing material comprises Zr, the Zr content in the brazing material is 0.30 mass % or less, preferably 0.05 to 0.10 mass %. When the brazing material comprises Cr, the Cr content in the brazing material is 0.30 mass % or less, preferably 0.05 to 0.10 mass %. When the brazing material comprises two or more of Mn, Ti, Zr, and Cr, the total of Mn Ti, Zr, and/or Cr contents in the brazing material is preferably 0.05 mass % or more. When the total of Mn, Ti, Zr, and/or Cr contents in the brazing material is less than 0.05 mass %, a large quantity of MgO is formed on the surface of the brazing material before the brazing material is molten in brazing heating, and the brazability decreases. By contrast, each of Mn, Ti, Zr. and Cr contents in the brazing material exceeds the corresponding range described above, giant intermetallic compounds are easily generated in casting and the plastic workability is reduced.

Each of the brazing materials may further comprise Bi. Bi included in each of the brazing materials promotes breakage of the oxide film with Mg supplied from the intermediate material and/or the core material to the brazing material in brazing heating, and improves the brazability. When each of the brazing materials comprises Bi, the Bi content in the brazing material is 1.00 mass % or less, preferably 0.004 to 0.50 mass %, and particularly preferably 0.05 to 0.30 mass %. The Bi content in the brazing material exceeding the range described above causes marked reduction of brazability accompanied by discoloration of the brazing material.

The brazing material may further comprise one or two or more of Na, Sr, and Sb. Na, Sr, or Sb is added to the brazing material to miniaturize the Si particles. When the brazing material comprises Na, the Na content in the brazing, material is 0.050 mass or less, preferably 0.003 to 0.050 mass %, and particularly preferably 0.005 to 0.030 mass %. When the brazing material comprises Sr, the Sr content in the brazing material is 0.050 mass % or less, preferably 0.003 to 0.050 mass %, and particularly preferably 0.005 to 0.030 mass %. When the brazing material comprises Sb, the Sb content in the brazing material is 0.050 mass % or less, preferably 0.003 to 0.050 mass and particularly preferably 0.005 to 0.030 mass %.

The brazing material may further comprise Mg. Mg in the brazing material breaks an aluminum oxide film covering the surface of the brazing material, and improves the brazability. When the brazing material comprises Mg, the Mg content in the brazing material is 2.00 mass % or less and preferably 0.01 to 1.00 mass %. When the Mg content in the brazing material exceeds the range described above, MgO is formed on the surface of the brazing material before the brazing material is molten during brazing heating, and the brazability is lowered.

The brazing material may further comprise one or two or more of Zn, In, Sn, and Cu. Zn, In, and Sn in the brazing material are capable of lowering the potential of the brazing material remaining on the surface of the core material after brazing. The sacrificial anticorrosion effect of the brazing material further improves corrosion resistance of the aluminum product after brazing. When the brazing material comprises Zn, the Zn content in the brazing material is 8.00 mass % or less and preferably 0.50 to 3.00 mass %. When the brazing material comprises In, the In content in the brazing material is 0.100 mass % or less and preferably 0.010 to 0.050 mass %. When the brazing material comprises Sn, the Sn content in the brazing material is 0.100 mass % or less and preferably 0.010 to 0.100 mass %. When the brazing; material comprises Cu, Cu is capable of increasing the potential of the brazing material. Cu included in the brazing material has the function of adjusting the potential to a more appropriate value when the potential of the brazing material is excessively lowered with Zn, In, and Sn. The Cu content in the brazing material is 1.20 mass % or less, 0 preferably 01 to 0.50 mass %, and particularly preferably 0.05 to 0.30 mass %.

The brazing material may further comprise Fe of 1.00 mass % or less and preferably 0.05 to 0.50 mass %.

The aluminum alloy brazing sheet according to the first embodiment of the present invention has a structure in which, in a drop-type fluidity test, a ratio $\alpha$ ($\alpha=K_a/K_b$) of a fluid coefficient $K_a$ after a 5% strain is applied to a fluid coefficient $K_b$ before the strain is applied is 0.55 or more and preferably 0.65 or more. In a drop-type fluidity test, when the ratio α ($\alpha=K_a/K_b$) of a fluid coefficient $K_a$ after a 5% strain is applied to a fluid coefficient $K_b$ before the strain is applied falls within the range described above, erosion rarely occurs in brazing heating. By contrast, in a drop-type fluidity test, when the ratio α ($\alpha=K_a/K_b$) of a fluid coefficient $K_a$ after a 5% strain is applied to a fluid coefficient $K_b$ before the strain is applied is less than the range described above, erosion occurs in brazing heating. The method for measuring the ratio α ($\alpha=K_a/K_b$) of the fluid coefficient $K_a$ after a 5% strain is applied to the fluid coefficient $K_b$ before the strain is applied in a drop-type fluidity test will be described later.

The aluminum alloy brazing sheet according to the second embodiment of the present invention is an aluminum alloy brazing sheet used for brazing of an aluminum material in an inert gas atmosphere or in vacuum and formed of a five-layer material in which a brazing material, an intermediate material, a core material, an intermediate material, and a brazing material are stacked in tins order, each of the intermediate materials being formed of an aluminum alloy and having a grain size of 20 to 300 μm, the aluminum alloy comprising Mg of 0.40 to 6.00 mass % with the balance being aluminum and inevitable impurities, the core material being formed of an aluminum alloy and having a grain size of 20 to 300 μm, the aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities, each of the brazing materials being formed of an aluminum alloy comprising Si of 4.00 to 13.00 mass % and further comprising one or two or more of Mn of 2.00 mass % or less, Ti of 0.30 mass % or less, Zr of 0.30 mass % or less, and Cr of 0.30 mass % or less, with the balance being aluminum and inevitable impurities, and in a drop-type fluidity test, a ratio α ($\alpha=K_a/K_b$) of a fluid coefficient $K_a$ after a 5% strain is applied to a fluid coefficient $K_b$ before the strain is applied being 0.55 or more.

The aluminum alloy brazing sheet according to the second embodiment of the present invention is a five-layer material in which a brazing material 1, an intermediate material 1, a core material, an intermediate material 2, and a brazing material 2 are stacked and cladded in the order of brazing material 1/intermediate material 1/core material/intermediate material 2/brazing material 2. Specifically, the aluminum alloy brazing sheet according to the second embodiment of the present invention is a clad material in which the brazing material 1 and the intermediate material 1 are cladded onto one side surface of the core material in the order of "intermediate material 1/brazing material 1" from the core material side, and the intermediate material 2 and the brazing material 2 are cladded onto the other side surface of the core material in the order of "intermediate material 2/brazing material 2" from the core material side. In the aluminum alloy brazing sheet according to the second embodiment of the present invention, the chemical composition of the brazing material 1 may be the same as, or different from, the chemical composition of the brazing material 2. In addition, in the aluminum alloy brazing sheet according to the second embodiment of the present invention, the chemical composition of the intermediate material 1 may be the same as, or different from, the chemical composition of the intermediate material 2.

The core material, the intermediate materials (intermediate material 1 and intermediate material 2), and the brazing materials (brazing material 1 and brazing material 2) according to the second embodiment of the present invention are the same as the core material, the intermediate material, and the brazing materials of the aluminum alloy brazing sheet according to the first embodiment of the present invention.

The aluminum alloy brazing sheet according to the second embodiment of the present invention has a structure in which, in a drop-type fluidity test, a ratio α ($\alpha=K_a/K_b$) of a fluid coefficient $K_a$ after a 5% strain is applied to a fluid coefficient $K_b$ before the strain is applied is 0.55 or more and preferably 0.65 or more. In a drop-type fluidity test, when the ratio α ($\alpha=K_a/K_b$) of a fluid coefficient $K_a$ after a 5% strain is applied to a fluid coefficient $K_b$ before the strain is applied falls within the range described above, erosion rarely occurs in brazing heating. By contrast, in a drop-type fluidity test, when the ratio α ($\alpha=K_a/K_b$) of a fluid coefficient $K_a$ after a 5% strain is applied to a fluid coefficient $K_b$ before the strain is applied is less than the range described above, erosion occurs in brazing heating. The method for measuring the ratio α ($\alpha=K_a/K_b$) of the fluid coefficient $K_a$ after a 5% strain is applied to the fluid coefficient $K_b$ before the strain is applied in a drop-type fluidity test will be described later.

When the intermediate material or the core material of the aluminum alloy brazing sheet comprises Mg, the solidus temperature of the intermediate material or the core material is low. In addition, when a strain is applied to the aluminum alloy brazing sheet before brazing heating, recrystallization occurs in brazing heating. Although the grain size becomes coarse, because subgrains remain and Si is infiltrated into the subgrain boundary of the subgrains, erosion easily occurs. For this reason, in the process of manufacturing the aluminum alloy brazing sheet, the processing ratio before final annealing is reduced to optimize the grain size of the material, and the heat input at and after hot working is increased to coarsen the fine Mn-based compound. In addition, Mg is precipitated to increase the recrystallization temperature and increase the recrystallization grain size in brazing heating, and generation of subgrains is suppressed. With this structure, erosion is suppressed. In addition, the inventors of the present invention have found that: (I) the aluminum alloy brazing sheet in which, in a drop-type fluidity test, a ratio α ($\alpha=K_a/K_b$) of a fluid coefficient $K_a$ after a 5% strain is applied to a fluid coefficient $K_b$ before the strain is applied is 0.55 or more and preferably 0.65 or more is obtained, by setting the working ratio before final annealing to 20 to 70% in the manufacturing process of the aluminum alloy brazing sheet, specifically, by setting a working ratio (working ratio=(($t_a-t_b$)/$t_a$)×100) of a thickness $t_b$ before the final annealing to a thickness $t_a$ after the last intermediate annealing among the intermediate annealings executed between passes of cold rolling in the cold working to 20 to 70% and (II) in the aluminum alloy brazing sheet in which, in a chop-type fluidity test, a ratio α ($\alpha=K_a/K_b$) of a fluid coefficient $K_a$ after a 5% strain is applied to a fluid coefficient $K_b$ before the strain is applied is 0.55 or more and preferably 0.65 or more, erosion rarely occurs even when a strain is applied when the aluminum alloy brazing sheet is processed into a predetermined shape before brazing, that is, erosion in brazing heating is suppressed by setting, in a drop-type fluidity test, "a ratio α ($\alpha=K_a/K_b$) of a fluid coefficient $K_a$ after a 5% strain is applied to a fluid coefficient $K_b$ before the strain is applied" to 0.55 or more and preferably 0.65 or more.

Figure 2:
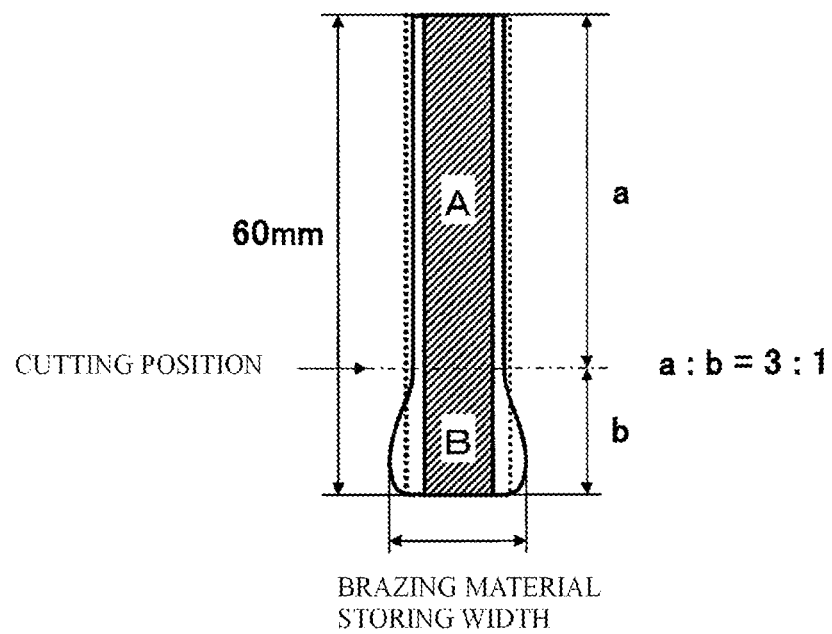
FIG. 2 is a diagram illustrating a state of an aluminum alloy brazing sheet according to a first embodiment of the present invention and an aluminum alloy brazing sheet according to a second embodiment of the present invention after heating in a drop-type fluidity test.

In the present invention, a ratio α (α=$K_a/K_b$) of a fluid coefficient $K_a$ after a 5% tram is applied to a fluid coefficient $K_b$ before the strain is applied can be determined by the following process. Two aluminum alloy brazing sheets (before a strain is applied) serving as test materials are prepared, and a 5% strain is applied to one of the sheets by cold rolling to prepare a test material provided with a 5% strain. Applying a 5% strain by cold rolling means that the test material is subjected to processing to reduce the thickness of the test material by a thickness corresponding to 5% of the thickness thereof at the time before the strain is applied. For example, when the thickness of the test material before the strain is applied is 0.500 mm, a strain in the case where processing is executed to reduce the thickness to 0.475 mm by cold rolling is 5%. Thereafter, fluid coefficients of the test materials are determined by a drop-type fluidity test using the test material before a strain is applied and the test material provided with the 5% strain. Each of the test materials is cut to a size of 40 mm (width)×60 mm (length), with the rolling direction serving as the longitudinal direction, and provided with two hanging holes 3 φ, and thereafter weight (W0) thereof is measured. Thereafter, the test materials are hung as illustrated in FIG. 2, heated to a maximum temperature of 600° C. with an average temperature increase speed of 20° C./min from the room temperature to 600° C. in a nitrogen gas furnace (oxygen concentration: 15 to 20 ppm), and maintained for three minutes at 600° C. After heating, as illustrated in FIG. 2, the brazing material storing portion (B) is cut to measure the weight (WB) thereof, and the fluid coefficient (K) is determined by equation (1):

$$K=(4WB-W0)/(3W0\times\text{clad ratio}) \quad (1).$$

The fluid coefficient ($K_b$) of the test material before the strain is applied and the fluid coefficient ($K_a$) after the 5% strain is applied are determined, and the ratio α (α=$K_a/K_b$) of the fluid coefficient $K_a$ after the 5% strain is applied to the fluid coefficient $K_b$ before the strain is applied is calculated by equation (2):

$$\alpha=K_a/K_b \quad (2).$$

The fluid coefficient ratio α is determined as a mean value of the brazing material 1 side and the brazing material 2 side, when the brazing material 1 side and the brazing material 2 side have different fluid coefficients because of the difference in composition between the brazing material 1 and the brazing material 2, the difference in composition between the intermediate material and the core material, or the difference in composition between the intermediate material 1 and the intermediate material 2.

The aluminum alloy brazing sheet according to the first embodiment of the present invention and the aluminum alloy brazing sheet according to the second embodiment of the present invention are suitably used for brazing the aluminum material in an inert gas atmosphere, such as a nitrogen gas atmosphere, or in vacuum without using a flux, that is, flux-less brazing. The aluminum alloy brazing sheet according to the present invention is used for tubes serving as channel forming materials through which the coolant or the like flows, and/or plates joined with the tubes to form the structures of heat exchangers. When the aluminum alloy brazing sheet according to the present invention is used for the tube material, the thickness of the brazing sheet is approximately 0.15 to 0.5 mm, and the clad ratio of the brazing material and the intermediate material is generally approximately 3 to 30%. When the aluminum alloy brazing sheet according to the present invention is used for the plate material, the thickness of the brazing sheet is approximately 0.8 to 5 mm, and the clad ratio of the brazing material and the intermediate material is generally approximately 3 to 30%.

The following is an explanation of a method for manufacturing the aluminum alloy brazing sheet according to the present invention. The method for manufacturing the aluminum alloy brazing sheet according, to the present invention is a method for manufacturing the aluminum alloy brazing sheet, by executing at least hot working, cold working, one or more intermediate annealings between rolling passes in the cold working, and final annealing after the last pass of the cold working on a stacked structure acquired by stacking a brazing material ingot, an intermediate material ingot, a core material ingot, and a brazing material ingot in this order to acquire the aluminum alloy brazing sheet in the method according to the first embodiment of the present invention and by stacking a brazing material ingot, an intermediate material ingot, a core material ingot, an intermediate material ingot, and a brazing material ingot in his order to acquire the aluminum alloy brazing sheet in the method according to the second embodiment of the present invention, wherein each of the intermediate material ingots is formed of an aluminum alloy comprising Mg of 0.40 to 6.00 mass % with the balance being aluminum and inevitable impurities, the core material ingot is formed of an aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities, each of the brazing material ingots is formed of an aluminum alloy comprising Si of 4.00 to 13.00 mass % and further comprising one or two or more of Mn of 2.00 mass % or less, Ti of 0.30 mass % or less, Zr of 0.30 mass % or less, and Cr of 0.30 mass % or less, with the balance being aluminum and inevitable impurities, and a working ratio (working ratio=(($t_a$−$t_b$)/$t_a$)×100) of a thickness $t_b$ before the final annealing to a thickness $t_a$ after the last intermediate annealing among the intermediate annealings is 20 to 70%. Specifically, the method according to the first embodiment of the present invention and the method according to the second embodiment of the present invention are the same except that the stacked structures subjected to hot rolling are different. In the following explanation, the points common to the method according to the first embodiment of the present invention and the method according to the second embodiment of the present invention will be described, with the method according to the first embodiment and the method according to the second embodiment being collectively referred to as "method according to the present invention".

In the method for manufacturing the aluminum alloy brazing sheet according to the present invention, first, aluminum alloys having desired compositions used for the core material, the intermediate material, and the brazing material are melted and casted to prepare a core material ingot, an intermediate material ingot, and a brazing material ingot.

The methods for melting and casting the aluminum alloys are not particularly limited, but ordinary methods are used.

Thereafter, the core material ingot, the intermediate material ingot, and the brazing material ingot are homogenized, if necessary. The preferred temperature range of homogenization is 400 to 600° C., and the homogenization time is 2 to 20 hours.

Thereafter, the core material ingot, the intermediate material ingot, and the brazing material ingot are faced to predetermined thicknesses, and the intermediate material ingot and the brazing material ingot are superimposed in this order from the core material ingot side on one side surface of the core material ingot, and the brazing material ingot is superimposed on the other side surface of the core material ingot to acquire a stacked structure. As another embodiment, the intermediate material ingot and the brazing material ingot are superimposed in this order from the core material ingot side on one side surface of the core material ingot, and the intermediate material ingot and the brazing material ingot are superimposed in this order from the core material ingot side on the other side surface of the core material ingot to acquire a stacked structure.

The intermediate material ingot is formed of an aluminum alloy comprising Mg of 0.40 to 6.00 mass %, preferably 1.30 to 5.00 mass and particularly preferably 2.50 to 4.00 mass %, with the balance being aluminum and inevitable impurities.

The intermediate material ingot may father comprise Zn of 8.00 mass % or less and preferably 3.50 mass % or less.

The intermediate material ingot may further comprise one or two or more of Mn of 2.00 mass % or less, preferably 0.10 to 2.00 mass %, and particularly preferably 0.60 to 1.50 mass %, Cu of 1.20 mass % or less and preferably 0.05 to 1.00 mass %, Cr of 0.30 mass % or less, preferably 0.05 to 0.30 mass %, and particularly preferably 0.10 to 0.20 mass %, and Zr of 0.30 mass % or less, preferably 0.05 to 0.30 mass %, and particularly preferably 0.10 to 0.20 mass %. When the intermediate material ingot further comprises one or two or more of Mn, Cr, and Zr, the total of contents of Mn, Cr, and Zr is 0.10 mass or more, preferably 0.60 to 1.80 mass %, and particularly preferably 1.00 to 1.50 mass %.

The intermediate material ingot may further comprise Si. When the intermediate material ingot comprises Si, the Si content in the intermediate material ingot is 13.00 mass or less and preferably 1.00 to 13.00 mass %. The intermediate material ingot may comprise Si of 0.05 to 1.00 mass %.

The intermediate material ingot may further comprise Fe. When the intermediate material ingot comprises Fe, the Fe content in the intermediate ink material ingot is 1.00 mass % or less and preferably 0.05 to 0.50 mass %.

The intermediate material ingot may further comprise Bi. When the intermediate material ingot comprises Bi, the Bi content in the intermediate material ingot is 1.00 mass % or less, preferably 0.004 to 0.50 mass %, and particularly preferably 0.10 to 0.50 mass %.

The intermediate material ingot may further comprise one or two of In of 0.100 mass % or less and preferably 0.010 to 0.050 mass % and Sn of 0.100 mass % or less and preferably 0.010 to 0.100 mass %. Examples of inevitable impurities included in the intermediate material ingot include Ag, B, Be, Ca Cd, Co, Ga, Ge Mo, Na, Ni, P, Pb, Sr, V, and Hg. The intermediate material ingot according to the present invention may comprise the inevitable impurities, and the content of each of them is 0.05 mass % or less.

The core material ingot is formed of an aluminum alloy comprising Mg of 0.20 to 2.00 mass %, preferably 0.50 to 1.50 mass %, and particularly preferably 0.50 to 1.00 mass and further comprising one or two or more of Mn of 1.80 mass % or less and preferably 0.60 to 1.50 mass %, Si of 1.50 mass % or less, preferably 0.05 to 1.00 mass %, and particularly preferably 0.20 to 1.00 mass %, Fe of 1.00 mass % or less and preferably 0.05 to 0.70 mass %, Cu of 1.20 mass % or less and preferably 0.05 to 1.00 mass %, Ti of 0.30 mass % or less and preferably 0.10 to 0.20 mass %, Zr of 0.30 mass % or less and preferably 0.10 to 0.20 mass %, and Cr of 0.30 mass % or less and preferably 0.10 to 0.20 mass %, with the balance being aluminum and inevitable impurities. Examples of inevitable impurities included in core material ingot include Ag, B, Be, Bi, Ca, Cd, Co, Ga, Ge, Li, Mo, Na, Ni, P, Pb, V, Hg, In, Sn, Sr, and Zn. The core material ingot according to the present invention may comprise the inevitable impurities, and the content of each of them is 0.05 mass % or less.

The brazing material ingot is formed of an aluminum alloy comprising Si of 4.00 to 13.00 mass and further comprising one or two or more of Mn of 2.00 mass % or less and preferably 0.10 to 0.60 mass %, Ti of 0.30 mass % or less and preferably 0.05 to 0.10 mass Zr of 0.30 mass % or less and preferably 0.05 to 0.10 mass and Cr of 0.30 mass % or less and preferably 0.05 to 0.10 mass %, with the balance being aluminum and inevitable impurities.

The brazing material ingot may further comprise Bi. When the brazing material ingot comprises Bi, the Bi content in the brazing material ingot is 1.00 mass % or less, preferably 0.004 to 0.50 mass %, and particularly preferably 0.05 to 0.30 mass %.

The brazing material ingot may further comprise one or two or more of Na, Sr, and Sb. When the brazing material ingot comprises Na, the Na content in the brazing material ingot is 0.050 mass % or less, preferably 0.003 to 0.050 mass %, and particularly preferably 0.005 to 0.030 mass %. When the brazing material ingot comprises Sr, the Sr content in the brazing material ingot is 0.050 mass % or less, preferably 0.003 to 0.050 mass %, and particularly preferably 0.005 to 0.030 mass %. When the brazing material ingot comprises Sb, the Sb content in the brazing material ingot is 0.050 mass % or less, preferably 0.003 to 0.050 mass %, and particularly preferably 0.005 to 0.030 mass %.

The brazing material ingot may further comprise Mg. When the brazing material ingot comprises Mg, the Mg content in the brazing material is 2.00 mass % or less and preferably 0.01 to 1.00 mass %.

The brazing material ingot may further comprise one or two or more of Zn, In, Sn, and Cu. When the brazing material ingot comprises Zn, the Zn content in the brazing material ingot is 8.00 mass % or less and preferably 0.50 to 3.00 mass %. When the brazing material ingot comprises In, the In content in the brazing material ingot is 0.100 mass % or less and preferably 0.010 to 0.050 mass %. When the brazing material ingot comprises Sn, the Sn content in the brazing material ingot is 0.100 mass % or less and preferably 0.010 to 0.100 mass %. When the brazing material ingot comprises Cu, the Cu content in the brazing material ingot is 1.20 mass % or less, preferably 0.01 to 0.50 mass %, and particularly preferably 0.05 to 0.30 mass %.

The brazing material ingot may further comprise Fe. When the brazing material ingot comprises Fe, the Fe content in the brazing material ingot is 1.00 mass % or less and preferably 0.05 to 0.50 mass %. Examples of inevitable impurities included in the brazing material ingot include Ag, B, Be, Ca, Cd, Co, Ga, Ge, Li, Mo, Ni, P, Pb, V, and Hg. The brazing material ingot according to the present invention may comprise the inevitable impurities, and the content of each of them is 0.05 mass % or less.

In hot working, hot rolling at 400 to 550° C. is executed for a stacked structure acquired by stacking a brazing material ingot, an intermediate material ingot, a core material ingot, and a brazing material ingot in this order (method for manufacturing the aluminum alloy brazing sheet according to the first embodiment of the present invention) or a stacked structure acquired by stacking a brazing material ingot, an intermediate material ingot, a core material ingot, an intermediate material ingot, and a brazing material ingot in this order (method for manufacturing the aluminum alloy brazing sheet according to the second embodiment of the present invention). In hot rolling, for example, the stacked structure is rolled to a thickness of 2 to 8 mm.

In the cold working, the hot-rolled structure acquired by executing hot working is subjected to cold tolling. In the cold working, cold rolling is executed with a plurality of passes.

In the cold working, one or two or mote times of intermediate annealing are executed between passes of cold rolling. The temperature of the intermediate annealing is 200 to 500° C. and preferably 250 to 400° C. In the intermediate annealing, the temperature is increased to the intermediate annealing temperature, and cooling may be promptly started after the temperature reaches the intermediate annealing temperature, or cooling may be started after the structure is maintained for certain time at the intermediate annealing temperature after the temperature reaches the intermediate annealing temperature. The time for which the temperature is maintained in the intermediate annealing is 0 to 10 hours and preferably 1 to 5 hours.

After cold rolling, the cold-rolled structure acquired by cold working is subjected to final annealing to anneal the cold-rolled structure at 300 to 500° C. and preferably 350 to 450° C. In the final annealing, the temperature is increased to the final annealing temperature, and cooling may be promptly started after the temperature reaches the final annealing temperature, or cooling may be started after the structure is maintained for certain time at the final annealing temperature after the temperature reaches the final annealing temperature. The time for which the temperature is maintained in the final annealing is 0 to 10 hours and preferably 1 to 5 hours.

In addition, in the method for manufacturing the aluminum alloy clad material according to the present invention, a working ratio (working ratio=$((t_a-t_b)/t_a)\times 100$) of a thickness $t_b$ before the final annealing to a thickness $t_a$ after the last intermediate annealing among the intermediate annealings is 20 to 70%. Specifically, in the method for manufacturing the aluminum alloy clad material according to the present invention, after the last intermediate annealing is executed, cold working is executed such that the working ratio (working ratio=$((t_a-t_b)/t_a)\times 100$) is set to 20 to 70% in cold rolling before the final annealing. By setting the working ratio (working ratio=$((t_a-t_b)/t_a)\times 100$) of a thickness $t_b$ before the final annealing to a thickness $t_a$ after the last intermediate annealing to 20 to 70%, the grain sizes of the core material and the intermediate material are adjusted to 20 to 300 μm and preferably 50 to 200 μm.

The aluminum alloy clad material (the aluminum alloy brazing sheet according to the first embodiment of the present invention or the aluminum alloy brazing sheet according to the second embodiment of the present invention) is acquired by executing the method (the method according to the first embodiment of the present invention or the method according to the second embodiment of the present invention) for manufacturing the aluminum alloy clad material according to the present invention, as described above.

Examples will be illustrated hereinafter to specifically explain the present invention, but the present invention is not limited to the examples illustrated hereinafter.

EXAMPLES

By continuous casting, the brazing material, the intermediate material, and the core material ingots having the chemical compositions illustrated in Table 1, Table 3, Table 5, and Table 7 were prepared. Thereafter, the core material ingots were homogenized and thereafter subjected to facing to reduce the thickness of the core material ingots to a predetermined thickness. Thereafter, the brazing material ingots and the intermediate material ingots were subjected to hot rolling to set the thicknesses of the brazing material ingots and the intermediate material ingots to predetermined thicknesses. The brazing material ingots, the intermediate material ingots, and the core material ingots acquired as described above were superimposed with combinations as illustrated in Table 1, Table 3, Table 5, and Table 7 to prepare stacked structures. Each of the acquired stacked structures was hot-rolled to join the core material ingot and the brazing material ingot and prepare a clad material having a thickness of 3.0 mm. Each of the acquired clad materials was subjected to cold tolling, intermediate annealing, cold rolling, and final annealing in this order to acquire a test material having a thickness of 0.4 to 1.0 mm. The intermediate annealing and the final annealing were executed at a retaining temperature of 400° C. and with the retaining time of three hours. Table 2, Table 4, Table 6, and Table 8 illustrate the working ratio (working ratio (%)=$((t_a-t_b)/t_a)\times 100$) from a thickness ($t_a$) after the intermediate annealing to a thickness ($t_b$) before the final annealing.

<Measurement of Grain Size>

The cross section (L-LT face) of each of the prepared test materials was subjected to mirror polishing to execute surface shaping, thereafter subjected to barker etching, and a photomicrograph was taken. In the photomicrograph, with respect to the grain size of the intermediate material, a line segment parallel with an interface between the brazing material and the intermediate material was drawn on the brazing material and the intermediate material, the number of grains cut with the line segment was counted, and the gain sizes of the brazing material and the intermediate material were calculated with the calculation formula "grain size (μm)=(length of line segment (mm)×1000)/(number of cut grains×photograph magnifications)". Suppose that the number of grains at the end portion of the line segment was 0.5. With respect to the grain size of the core material, a line segment parallel with an interface between the intermediate material and the core material was drawn on the core material, the number of grains cut with the line segment was counted, and the grain size of the core material was calculated with the calculation formula "grain size (μm)=(length of line segment (mm)×1000)/(number of cut grains×photograph magnifications)". Suppose that the number of gains at the end portion of the line segment was 0.5. Table 1 illustrates the gain size of the brazing material. In Table 1, A denotes the grain size equal to or more than 5 μm, and X denotes the gain size less than 5 μm. With respect to the grain sizes of the intermediate material and the core material. Table 2, Table 4, Table 6, and Table 8 illustrate results of the grain sizes. In Table 2, Table 4, Table 6, and Table 8, X denotes the grain size exceeding 300 μm. A denotes the grain size equal to or less than 300 μm and equal to or more than 200 μm, B denotes the grain size less than 200 μm and equal to or more than 100 μm, C denotes the grain size less than 100 μm and equal to or more than 50 μm, D denotes the grain size less than 50 μm and equal to or more than 20 μm, and Y denotes the grain size less than 20 μm.

<Evaluation of Brazability>

The test material having a size of 50 mm 50 mm and subjected to only degreasing with acetone (not etched), the test material subjected to degreasing with acetone and thereafter etched with weak acid (etched), and a 3003 alloy sheet material having a thickness of 0.1 mm and subjected to corrugating and thereafter degreased were prepared and mounted on the miniature core illustrated in FIG. 1. The upper test piece of the miniature core contacted the corrugated fin on the brazing material 1 side, and the lower test piece contacted the corrugated fin on the brazing material 2 side.

Thereafter, brazing heating was executed in a nitrogen gas furnace. The nitrogen gas furnace was a batch-type experimental furnace. The oxygen concentration in brazing was set to 15 to 20 ppm. The maximum temperature of each of the test pieces was set to 600° C.

Thereafter, the corrugated fin was cut off from the miniature core after brazing. Thereafter, the lengths of the traces of the fillets existing on each plate were measured in the width direction of the plate, and the sum of them was calculated. Apart from it, the sum of lengths of the fillets in the width direction in the case where it was supposed that the plate and the corrugated fin were entirely joined was calculated. Then, the ratio of the former value to the latter value was regarded as the joining ratio (%) of the Corrugated fin in each test material. The joining ratio was calculated for each of the upper test piece and the lower test piece. Note that the latter value can be calculated by, for example, multiplying the width of the corrugated fin by the number of top portions of the corrugated fin.

<Drop-Type Fluidity Test>

The test materials of 0.4 to 1.0 mm acquired by the above process and the test materials acquired by applying a 5% strain by cold rolling to the test materials of 0.4 to 1.0 mm acquired by the above processing (test material acquired by rolling the test material to a thickness of 0.38 mm when the test material has a thickness of 0.4 mm) were subjected to a drop-type fluidity test to determine the fluid coefficients of them.

First, each of the test materials was cut to a size of 40 mm (width)×60 mm (length), with the rolling direction serving as the longitudinal direction, and provided with two hanging holes 3 φ, and thereafter weight (W0) thereof was measured. Thereafter, the test materials were hung as illustrated in FIG. 2, heated to the maximum temperature of 600° C. with an average temperature increase speed of 20° C./min from the room temperature to 600° C. in a nitrogen gas furnace, and maintained for three minutes at 600° C. After the heating test, the brazing material storing portion (B) was cut to measure the weight (WB) thereof and the fluid coefficient (K) was determined by equation (1):

$$K = (4WB - W0) / (3W0 \times \text{clad ratio}) \quad (1).$$

Thereafter, the ratio α of the fluid coefficient $K_a$ of the test material after the 5% strain was applied to the fluid coefficient $K_b$ of the test material before the strain was applied was calculated by equation (2):

$$\alpha = K_a / K_b \quad (2).$$

Table 2, Table 4, Table 6, and Table 8 illustrate the value of α, A denoting α having the value of 0.80 or more, B denoting α having the value less than 0.80 and equal to or more than 0.65, C denoting a having the value less than 0.65 and equal to or more than 0.55, and X denoting α having the value less than 0.55.

<Evaluation of Corrosion Resistance>

In the test materials, each of the test materials comprising Zn in the intermediate material and having a thickness of 0.4 mm and a size of 50 mm×100 min was degreased with acetone, thereafter provided with one hanging hole 5 φ, and then subjected to brazing heating in a hanging state in a nitrogen gas furnace. The maximum temperature of each of the test pieces was set to 600° C. The hanging upper portion 10 mm including the hanging hole and the brazing material storing portion 20 mm in the hanging lower portion were removed and the opposite surface and the end portions of the brazing material 1 were masked with silicone resin such that the brazing material 1 surface was exposed to expose a portion of 40 mm (width)×70 mm (length) to acquire a corrosion test piece. The test pieces were subjected to Sea Water Acetic Acid Test (SWAAT) based on ASTM G85. After the SWAAT, the silicone resin on the surface was peeled off, thereafter, each of the test pieces was immersed in a chromic-phosphoric liquid heated with a heater to remove the corrosion product on the surface of the sample, and the maximum corrosion depth was measured using a measuring microscope. In Tables 2.4, 6, and 8, X denotes the case where the maximum corrosion depth exceeded 0.30 min, and A denotes the case where the maximum corrosion depth was 0.30 mm or less.

In the item "brazing results of miniature core test materials" in Table 2, Table 4, Table 6, and Table 8, ○ denotes the case where both joining ratio on the core material side and joining ratio of the intermediate layer side were 85% or more, and × denotes the case where the joining ratios were less than 85%, as a result of executing brazing for the miniature core test materials. In evaluation of brazability of the present example, the ease where the average of the joining ratios was 85% or more was determined as an acceptable material because it had excellent brazability. In addition, the case where the average of the joining ratios was less than 85% was determined as a non-acceptable material because it had poor brazability.

TABLE 1

| TEST MATERIAL NO. | | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|---|
| | | | Si | Fe | Cu | Mn | Mg | Zn | Ti | Bi | OTHERS | | |
| INVENTION EXAMPLE | 1 | BRAZING MATERIAL 1 | 10.20 | 0.20 | — | 0.30 | — | — | — | — | — | 10 | 50 |
| | | INTERMEDIATE MATERIAL 1 | 0.20 | 0.20 | — | — | 2.00 | — | — | — | — | 10 | |

TABLE 1-continued

| TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|
| | | Si | Fe | Cu | Mn | Mg | Zn | Ti | Bi | OTHERS | | |
| | CORE MATERIAL | 0.20 | 0.20 | — | — | 1.00 | — | — | — | — | — | |
| | BRAZING MATERIAL 2 | 10.20 | 0.20 | — | 0.30 | — | — | — | — | — | 10 | |
| 2 | BRAZING MATERIAL 1 | 10.20 | 0.20 | — | 0.10 | — | — | — | 0.02 | — | 10 | 20 |
| | INTERMEDIATE MATERIAL 1 | 0.20 | 0.20 | — | — | 2.00 | — | — | — | — | 10 | |
| | CORE MATERIAL | 0.20 | 0.20 | — | — | 1.00 | — | — | — | — | — | |
| | BRAZING MATERIAL 2 | 10.20 | 0.20 | — | 0.10 | — | — | — | 0.02 | — | 10 | |
| 3 | BRAZING MATERIAL 1 | 10.20 | 0.20 | — | 1.50 | — | — | — | 0.50 | — | 10 | 70 |
| | INTERMEDIATE MATERIAL 1 | 0.20 | 0.20 | — | — | 2.00 | — | — | — | — | 10 | |
| | CORE MATERIAL | 0.20 | 0.20 | — | — | 1.00 | — | — | — | — | — | |
| | BRAZING MATERIAL 2 | 10.20 | 0.20 | — | 1.50 | — | — | — | 0.50 | — | 10 | |
| 4 | BRAZING MATERIAL 1 | 10.20 | 0.20 | — | — | — | — | 0.15 | 0.05 | — | 10 | 50 |
| | INTERMEDIATE MATERIAL 1 | 0.20 | 0.20 | 0.15 | 0.60 | 1.00 | 2.00 | — | — | — | 10 | |
| | CORE MATERIAL | 0.30 | 0.40 | 0.80 | 1.20 | 0.50 | — | 0.12 | — | — | — | |
| | BRAZING MATERIAL 2 | 10.20 | 0.20 | — | — | — | — | 0.15 | 0.05 | — | 10 | |
| 5 | BRAZING MATERIAL 1 | 10.20 | 0.20 | — | — | — | — | — | 0.60 | Sr:0.020 | 10 | 50 |
| | INTERMEDIATE MATERIAL 1 | 0.80 | 0.20 | — | — | 2.00 | 1.00 | — | — | — | 10 | |
| | CORE MATERIAL | 0.30 | 0.40 | 0.15 | 1.20 | 0.80 | — | — | — | — | — | |
| | BRAZING MATERIAL 2 | 10.20 | 0.20 | — | — | — | — | — | 0.60 | Sr:0.020 | 10 | |
| 6 | BRAZING MATERIAL 1 | 10.20 | 0.20 | 0.10 | 0.06 | — | 2.00 | — | 0.05 | In:0.020 | 10 | 50 |
| | INTERMEDIATE MATERIAL 1 | 0.20 | 0.20 | — | — | 2.00 | 1.00 | — | — | — | 10 | |
| | CORE MATERIAL | 0.30 | 0.40 | 0.15 | 1.20 | 0.80 | — | — | — | — | — | |
| | BRAZING MATERIAL 2 | 10.20 | 0.20 | 0.10 | 0.06 | — | 2.00 | — | 0.05 | In:0.020 | 10 | |
| 7 | BRAZING MATERIAL 1 | 10.20 | 0.20 | — | — | — | — | 0.06 | 0.05 | — | 10 | 50 |
| | INTERMEDIATE MATERIAL 1 | 10.00 | 0.20 | — | — | 5.00 | 1.80 | — | — | — | 10 | |
| | CORE MATERIAL | 0.30 | 0.40 | 0.15 | 1.20 | 0.80 | — | — | — | — | — | |
| | BRAZING MATERIAL 2 | 10.20 | 0.20 | — | — | — | — | 0.06 | 0.05 | — | 10 | |
| 8 | BRAZING MATERIAL 1 | 12.20 | 0.20 | — | — | — | — | 0.25 | 0.05 | — | 10 | 50 |
| | INTERMEDIATE MATERIAL 1 | 0.20 | 0.20 | — | — | 5.00 | — | — | 0.05 | — | 10 | |
| | CORE MATERIAL | 0.30 | 0.40 | 0.15 | 1.20 | 0.80 | — | — | — | — | — | |
| | BRAZING MATERIAL 2 | 12.20 | 0.20 | — | — | — | — | 0.25 | 0.05 | — | 10 | |
| 9 | BRAZING MATERIAL 1 | 6.00 | 0.20 | — | 0.10 | — | — | — | 0.05 | — | 10 | 50 |
| | INTERMEDIATE MATERIAL 1 | 0.20 | 0.20 | — | — | 2.00 | — | — | 0.60 | — | 10 | |
| | CORE MATERIAL | 0.30 | 0.40 | 0.15 | 1.20 | 0.80 | — | — | — | — | — | |
| | BRAZING MATERIAL 2 | 6.00 | 0.20 | — | 0.10 | — | — | — | 0.05 | — | 10 | |

TABLE 1-continued

| TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|
| | | Si | Fe | Cu | Mn | Mg | Zn | Ti | Bi | OTHERS | | |
| 10 | BRAZING MATERIAL 1 | 10.20 | 0.20 | — | — | 0.05 | — | — | 0.05 | — | 10 | 50 |
| | INTERMEDIATE MATERIAL 1 | 0.20 | 0.20 | — | — | 2.00 | — | — | — | In:0.020 | 10 | |
| | CORE MATERIAL | 0.30 | 0.40 | 0.15 | 1.20 | 0.80 | — | — | — | — | — | |
| | BRAZING MATERIAL 2 | 10.20 | 0.20 | — | — | 0.05 | — | — | 0.05 | — | 10 | |
| 11 | BRAZING MATERIAL 1 | 10.20 | 0.20 | 1.00 | 0.10 | — | 3.00 | — | 0.05 | — | 10 | 50 |
| | INTERMEDIATE MATERIAL 1 | 0.20 | 0.20 | — | — | 4.00 | — | — | — | — | 10 | |
| | CORE MATERIAL | 0.30 | 0.40 | 0.15 | 1.20 | 0.80 | — | — | — | — | — | |
| | BRAZING MATERIAL 2 | 10.20 | 0.20 | 1.00 | 0.10 | — | 3.00 | — | 0.05 | — | 10 | |
| 12 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | BRAZING MATERIAL 2 | 12.20 | 0.20 | — | 0.10 | — | — | — | 0.05 | — | 10 | |

TABLE 2

| TEST MATERIAL NO. | CLAD STRUCTURE | INTERMEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS | | FLUID COEFFICIENT RATIO α | CORROSION RESISTANCE MAXIMUM CORROSION DEPTH (mm) |
|---|---|---|---|---|---|---|---|---|
| | | | | | NOT ETCHED | ETCHED | | |
| 1 | BRAZING MATERIAL 1 INTERMEDIATE MATERIAL 1 CORE MATERIAL BRAZING MATERIAL 2 | C | A | A | UPPER SIDE:○ LOWER SIDE:○ | UPPER SIDE:○ LOWER SIDE:○ | A | |
| 2 | BRAZING MATERIAL 1 INTERMEDIATE MATERIAL 1 CORE MATERIAL BRAZING MATERIAL 2 | B | B | A | UPPER SIDE:○ LOWER SIDE:○ | UPPER SIDE:○ LOWER SIDE:○ | B | |
| 3 | BRAZING MATERIAL 1 INTERMEDIATE MATERIAL 1 CORE MATERIAL BRAZING MATERIAL 2 | D | D | A | UPPER SIDE:○ LOWER SIDE:○ | UPPER SIDE:○ LOWER SIDE:○ | B | |
| 4 | BRAZING MATERIAL 1 INTERMEDIATE MATERIAL 1 CORE MATERIAL BRAZING MATERIAL 2 | B | B | A | UPPER SIDE:○ LOWER SIDE:○ | UPPER SIDE:○ LOWER SIDE:○ | B | A |
| 5 | BRAZING MATERIAL 1 INTERMEDIATE MATERIAL 1 CORE MATERIAL BRAZING MATERIAL 2 | B | B | A | UPPER SIDE:○ LOWER SIDE:○ | UPPER SIDE:○ LOWER SIDE:○ | B | A |
| 6 | BRAZING MATERIAL 1 INTERMEDIATE MATERIAL 1 CORE MATERIAL BRAZING MATERIAL 2 | B | B | A | UPPER SIDE:○ LOWER SIDE:○ | UPPER SIDE:○ LOWER SIDE:○ | B | A |

TABLE 2-continued

| TEST MATERIAL NO. | CLAD STRUCTURE | INTER-MEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS NOT ETCHED | ETCHED | FLUID COEFFICIENT RATIO α | CORROSION RESISTANCE MAXIMUM CORROSION DEPTH (mm) |
|---|---|---|---|---|---|---|---|---|
| 7 | BRAZING MATERIAL 1 INTERMEDIATE MATERIAL 1 CORE MATERIAL BRAZING MATERIAL 2 | C | B | A | UPPER SIDE:○ LOWER SIDE:○ | UPPER SIDE:○ LOWER SIDE:○ | B | A |
| 8 | BRAZING MATERIAL 1 INTERMEDIATE MATERIAL 1 CORE MATERIAL BRAZING MATERIAL 2 | C | B | A | UPPER SIDE:○ LOWER SIDE:○ | UPPER SIDE:○ LOWER SIDE:○ | B | |
| 9 | BRAZING MATERIAL 1 INTERMEDIATE MATERIAL 1 CORE MATERIAL BRAZING MATERIAL 2 | B | B | A | UPPER SIDE:○ LOWER SIDE:○ | UPPER SIDE:○ LOWER SIDE:○ | B | |
| 10 | BRAZING MATERIAL 1 INTERMEDIATE MATERIAL 1 CORE MATERIAL BRAZING MATERIAL 2 | C | B | A | UPPER SIDE:○ LOWER SIDE:○ | UPPER SIDE:○ LOWER SIDE:○ | B | |
| 11 | BRAZING MATERIAL 1 INTERMEDIATE MATERIAL 1 CORE MATERIAL BRAZING MATERIAL 2 | C | B | A | UPPER SIDE:○ LOWER SIDE:○ | UPPER SIDE:○ LOWER SIDE:○ | B | |
| 12 | BRAZING MATERIAL 1 INTERMEDIATE MATERIAL 1 CORE MATERIAL BRAZING MATERIAL 2 | C | B | A | UPPER SIDE:○ LOWER SIDE:○ | UPPER SIDE:○ LOWER SIDE:○ | B | |

TABLE 3

| | TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|---|
| | | | Si | Fe | Cu | Mn | Mg | Zn | Ti | Bi | OTHERS | | |
| INVENTION EXAMPLE | 21 | BRAZING MATERIAL 1 | 10.20 | 0.20 | — | 0.30 | — | — | — | — | — | 10 | 50 |
| | | INTERMEDIATE MATERIAL 1 | 0.20 | 0.20 | — | — | 2.00 | — | — | — | — | 10 | |
| | | CORE MATERIAL | 0.20 | 0.20 | — | — | 1.00 | — | — | — | — | — | |
| | | INTERMEDIATE MATERIAL 2 | 0.20 | 0.20 | — | — | 2.00 | — | — | — | — | 10 | |
| | | BRAZING MATERIAL 2 | 10.20 | 0.20 | — | 0.30 | — | — | — | — | — | 10 | |
| | 22 | BRAZING MATERIAL 1 | 10.20 | 0.20 | — | 0.10 | — | — | — | 0.02 | — | 10 | 20 |
| | | INTERMEDIATE MATERIAL 1 | 0.20 | 0.20 | — | — | 2.00 | — | — | — | — | 10 | |
| | | CORE MATERIAL | 0.20 | 0.20 | — | — | 1.00 | — | — | — | — | — | |
| | | INTERMEDIATE MATERIAL 2 | 0.20 | 0.20 | — | — | 2.00 | — | — | — | — | 10 | |
| | | BRAZING MATERIAL 2 | 10.20 | 0.20 | — | 0.10 | — | — | — | 0.02 | — | 10 | |
| | 23 | BRAZING MATERIAL 1 | 10.20 | 0.20 | — | 1.50 | — | — | — | 0.50 | — | 10 | 70 |
| | | INTERMEDIATE MATERIAL 1 | 0.20 | 0.20 | — | — | 2.00 | — | — | — | — | 10 | |
| | | CORE MATERIAL | 0.20 | 0.20 | — | — | 1.00 | — | — | — | — | — | |

TABLE 3-continued

| TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|
| | | Si | Fe | Cu | Mn | Mg | Zn | Ti | Bi | OTHERS | | |
| | INTERMEDIATE MATERIAL 2 | 0.20 | 0.20 | — | — | 2.00 | — | — | — | — | 10 | |
| | BRAZING MATERIAL 2 | 10.20 | 0.20 | — | 1.50 | — | — | — | 0.50 | — | 10 | |
| 24 | BRAZING MATERIAL 1 | 10.20 | 0.20 | — | — | — | — | 0.15 | 0.05 | — | 10 | 50 |
| | INTERMEDIATE MATERIAL 1 | 0.20 | 0.20 | 0.15 | 0.60 | 1.00 | 2.00 | — | — | — | 10 | |
| | CORE MATERIAL | 0.30 | 0.40 | 0.80 | 1.20 | 0.50 | — | 0.12 | — | — | — | |
| | INTERMEDIATE MATERIAL 2 | 0.20 | 0.20 | 0.15 | 0.60 | 1.00 | 2.00 | — | — | — | 10 | |
| | BRAZING MATERIAL 2 | 10.20 | 0.20 | — | — | — | — | 0.15 | 0.05 | — | 10 | |
| 25 | BRAZING MATERIAL 1 | 10.20 | 0.20 | — | — | — | — | — | 0.60 | Sr:0.02 | 10 | 50 |
| | INTERMEDIATE MATERIAL 1 | 0.80 | 0.20 | — | — | 2.00 | 1.00 | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.80 | 0.20 | — | — | 2.00 | 1.00 | — | — | — | 10 | |
| | BRAZING MATERIAL 2 | 10.20 | 0.20 | — | — | — | — | — | 0.60 | Sr:0.02 | 10 | |
| 26 | BRAZING MATERIAL 1 | 10.20 | 0.20 | 0.10 | 0.06 | — | 2.00 | — | 0.05 | In:0.02 | 10 | 50 |
| | INTERMEDIATE MATERIAL 1 | 0.20 | 0.20 | — | — | 2.00 | 1.00 | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 2.00 | 1.00 | — | — | — | 10 | |
| | BRAZING MATERIAL 2 | 10.20 | 0.20 | 0.10 | 0.06 | — | 2.00 | — | 0.05 | In:0.02 | 10 | |
| 27 | BRAZING MATERIAL 1 | 10.20 | 0.20 | — | — | — | — | 0.06 | 0.05 | — | 10 | 50 |
| | INTERMEDIATE MATERIAL 1 | 10.00 | 0.20 | — | — | 5.00 | 1.80 | — | — | — | 10 | |
| | CORE MATERIAL | 0.30 | 0.40 | 0.15 | 1.20 | 0.80 | — | — | — | — | — | |
| | INTERMEDIATE MATERIAL 2 | 10.00 | 0.20 | — | — | 5.00 | 1.80 | — | — | — | 10 | |
| | BRAZING MATERIAL 2 | 10.20 | 0.20 | — | — | — | — | 0.06 | 0.05 | — | 10 | |
| 28 | BRAZING MATERIAL 1 | 12.20 | 0.20 | — | — | — | — | 0.25 | 0.05 | — | 10 | 50 |
| | INTERMEDIATE MATERIAL 1 | 0.20 | 0.20 | — | — | 5.00 | — | — | 0.05 | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 5.00 | — | — | 0.05 | — | 10 | |
| | BRAZING MATERIAL 2 | 12.20 | 0.20 | — | — | — | — | 0.25 | 0.05 | — | 10 | |
| 29 | BRAZING MATERIAL 1 | 6.00 | 0.20 | — | 0.10 | — | — | — | 0.05 | — | 10 | 50 |
| | INTERMEDIATE MATERIAL 1 | 0.20 | 0.20 | — | — | 2.00 | — | — | 0.60 | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 2.00 | — | — | 0.60 | — | 10 | |
| | BRAZING MATERIAL 2 | 6.00 | 0.20 | — | 0.10 | — | — | — | 0.05 | — | 10 | |
| 30 | BRAZING MATERIAL 1 | 10.20 | 0.20 | — | — | 0.05 | — | — | 0.05 | — | 10 | 50 |
| | INTERMEDIATE MATERIAL 1 | 0.20 | 0.20 | — | — | 2.00 | — | — | — | In:0.02 | 10 | |
| | CORE MATERIAL | 0.30 | 0.40 | 0.15 | 1.20 | 0.80 | — | — | — | — | — | |

TABLE 3-continued

| TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|
| | | Si | Fe | Cu | Mn | Mg | Zn | Ti | Bi | OTHERS | | |
| | INTERMEDIATE MATERIAL 2 | 0.20 | 0.20 | — | — | 2.00 | — | — | — | In:0.02 | 10 | |
| | BRAZING MATERIAL 2 | 10.20 | 0.20 | — | — | 0.05 | — | — | 0.05 | — | 10 | |
| 31 | BRAZING MATERIAL 1 | 10.20 | 0.20 | 1.00 | 0.10 | — | 3.00 | — | 0.05 | — | 10 | 50 |
| | INTERMEDIATE MATERIAL 1 | 0.20 | 0.20 | — | — | 4.00 | — | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 4.00 | — | — | — | — | 10 | |
| | BRAZING MATERIAL 2 | 10.20 | 0.20 | 1.00 | 0.10 | — | 3.00 | — | 0.05 | — | 10 | |
| 32 | BRAZING MATERIAL 1 | 10.20 | 0.20 | — | 0.10 | 0.80 | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 2.00 | 1.00 | — | — | — | 10 | |
| | BRAZING MATERIAL 2 | 10.20 | 0.20 | — | 0.10 | 0.80 | — | — | 0.05 | — | 10 | |
| 33 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 2.00 | — | — | — | — | 10 | |
| | BRAZING MATERIAL 2 | 12.20 | 0.20 | — | 0.10 | — | — | — | 0.05 | — | 10 | |

TABLE 4

| | TEST MATERIAL NO. | CLAD STRUCTURE | INTERMEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS | | FLUID COEFFICIENT RATIO α | CORROSION RESISTANCE MAXIMUM CORROSION DEPTH (mm) |
|---|---|---|---|---|---|---|---|---|---|
| | | | | | | NOT ETCHED | ETCHED | | |
| INVENTION EXAMPLE | 21 | BRAZING MATERIAL 1 INTERMEDIATE MATERIAL 1 CORE MATERIAL INTERMEDIATE MATERIAL 2 BRAZING MATERIAL 2 | B | A | A | UPPER SIDE:○ LOWER SIDE:○ | UPPER SIDE:○ LOWER SIDE:○ | A | |
| | 22 | BRAZING MATERIAL 1 INTERMEDIATE MATERIAL 1 CORE MATERIAL INTERMEDIATE MATERIAL 2 BRAZING MATERIAL 2 | C | D | A | UPPER SIDE:○ LOWER SIDE:○ | UPPER SIDE:○ LOWER SIDE:○ | B | |

TABLE 4-continued

| TEST MATERIAL NO. | CLAD STRUCTURE | INTERMEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS | | FLUID COEFFICIENT RATIO α | CORROSION RESISTANCE MAXIMUM CORROSION DEPTH (mm) |
|---|---|---|---|---|---|---|---|---|
| | | | | | NOT ETCHED | ETCHED | | |
| 23 | BRAZING MATERIAL 1 INTERMEDIATE MATERIAL 1 CORE MATERIAL INTERMEDIATE MATERIAL 2 BRAZING MATERIAL 2 | C | D | A | UPPER SIDE:○ LOWER SIDE:○ | UPPER SIDE:○ LOWER SIDE:○ | B | |
| 24 | BRAZING MATERIAL 1 INTERMEDIATE MATERIAL 1 CORE MATERIAL INTERMEDIATE MATERIAL 2 BRAZING MATERIAL 2 | B | B | A | UPPER SIDE:○ LOWER SIDE:○ | UPPER SIDE:○ LOWER SIDE:○ | B | A |
| 25 | BRAZING MATERIAL 1 INTERMEDIATE MATERIAL 1 CORE MATERIAL INTERMEDIATE MATERIAL 2 BRAZING MATERIAL 2 | B | B | A | UPPER SIDE:○ LOWER SIDE:○ | UPPER SIDE:○ LOWER SIDE:○ | B | A |
| 26 | BRAZING MATERIAL 1 INTERMEDIATE MATERIAL 1 CORE MATERIAL INTERMEDIATE MATERIAL 2 BRAZING MATERIAL 2 | C | B | A | UPPER SIDE:○ LOWER SIDE:○ | UPPER SIDE:○ LOWER SIDE:○ | B | A |
| 27 | BRAZING MATERIAL 1 INTERMEDIATE MATERIAL 1 CORE MATERIAL INTERMEDIATE MATERIAL 2 BRAZING MATERIAL 2 | C | B | A | UPPER SIDE:○ LOWER SIDE:○ | UPPER SIDE:○ LOWER SIDE:○ | B | A |
| 28 | BRAZING MATERIAL 1 INTERMEDIATE MATERIAL 1 CORE MATERIAL INTERMEDIATE MATERIAL 2 BRAZING MATERIAL 2 | C | B | A | UPPER SIDE:○ LOWER SIDE:○ | UPPER SIDE:○ LOWER SIDE:○ | B | |
| 29 | BRAZING MATERIAL 1 INTERMEDIATE MATERIAL 1 CORE MATERIAL INTERMEDIATE MATERIAL 2 BRAZING MATERIAL 2 | C | B | A | UPPER SIDE:○ LOWER SIDE:○ | UPPER SIDE:○ LOWER SIDE:○ | B | |

TABLE 4-continued

| TEST MATERIAL NO. | CLAD STRUCTURE | INTERMEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS NOT ETCHED | BRAZING RESULTS OF MINIATURE CORE TEST MATERIALS ETCHED | FLUID COEFFICIENT RATIO α | CORROSION RESISTANCE MAXIMUM CORROSION DEPTH (mm) |
|---|---|---|---|---|---|---|---|---|
| 30 | BRAZING MATERIAL 1 INTERMEDIATE MATERIAL 1 CORE MATERIAL INTERMEDIATE MATERIAL 2 BRAZING MATERIAL 2 | C | B | A | UPPER SIDE:○ LOWER SIDE:○ | UPPER SIDE:○ LOWER SIDE:○ | B | |
| 31 | BRAZING MATERIAL 1 INTERMEDIATE MATERIAL 1 CORE MATERIAL INTERMEDIATE MATERIAL 2 BRAZING MATERIAL 2 | B | B | A | UPPER SIDE:○ LOWER SIDE:○ | UPPER SIDE:○ LOWER SIDE:○ | B | |
| 32 | BRAZING MATERIAL 1 INTERMEDIATE MATERIAL 1 CORE MATERIAL INTERMEDIATE MATERIAL 2 BRAZING MATERIAL 2 | INTERMEDIATE 1:C INTERMEDIATE 2:C | B | A | UPPER SIDE:○ LOWER SIDE:○ | UPPER SIDE:○ LOWER SIDE:○ | B | |
| 33 | BRAZING MATERIAL 1 INTERMEDIATE MATERIAL 1 CORE MATERIAL INTERMEDIATE MATERIAL 2 BRAZING MATERIAL 2 | C | B | A | UPPER SIDE:○ LOWER SIDE:○ | UPPER SIDE:○ LOWER SIDE:○ | B | |

TABLE 5

| | TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|---|
| | | | Si | Fe | Cu | Mn | Mg | Zn | Ti | Bi | OTHERS | | |
| COMPARATIVE EXAMPLE | R1 | BRAZING MATERIAL 1 | 10.20 | 0.20 | — | — | — | — | — | — | — | 10 | 50 |
| | | INTERMEDIATE MATERIAL 1 | 0.20 | 0.20 | — | — | 2.00 | — | — | — | — | 10 | |
| | | CORE MATERIAL | 0.20 | 0.20 | — | — | 1.00 | — | — | — | — | — | |
| | | BLAZING MATERIAL 2 | 10.20 | 0.20 | — | — | — | — | — | — | — | 10 | |
| | R2 | BRAZING MATERIAL 1 | 10.20 | 0.20 | — | 1.00 | — | — | — | 0.05 | — | 10 | 10 |
| | | INTERMEDIATE MATERIAL 1 | 0.20 | 0.20 | — | — | 2.00 | — | — | — | — | 10 | |
| | | CORE MATERIAL | 0.30 | 0.40 | 0.15 | 1.20 | 0.80 | — | — | — | — | — | |
| | | BLAZING MATERIAL 2 | 10.20 | 0.20 | — | 0.10 | — | — | — | 0.05 | — | 10 | |

TABLE 5-continued

| TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|
| | | Si | Fe | Cu | Mn | Mg | Zn | Ti | Bi | OTHERS | | |
| R3 | BRAZING MATERIAL 1 | 10.20 | 0.20 | — | 0.10 | — | — | — | 0.05 | — | 10 | 90 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | BLAZING MATERIAL 2 | 10.20 | 0.20 | — | 0.10 | — | — | — | 0.05 | — | 10 | |
| R4 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 0.20 | — | — | — | — | 10 | |
| | CORE MATERIAL | 0.30 | 0.40 | 0.15 | 1.20 | 0.80 | — | — | — | — | — | |
| | BLAZING MATERIAL 2 | 10.20 | 0.20 | — | 0.10 | — | — | — | 0.05 | — | 10 | |
| R5 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 7.00 | — | — | — | — | 10 | |
| | CORE MATERIAL | 0.30 | 0.40 | 0.15 | 1.20 | 0.80 | — | — | — | — | — | |
| | BLAZING MATERIAL 2 | 10.20 | 0.20 | — | 0.10 | — | — | — | 0.05 | — | 10 | |
| R6 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.10 | — | — | — | — | — | |
| | BLAZING MATERIAL 2 | 10.20 | 0.20 | — | 0.10 | — | — | — | 0.05 | — | 10 | |
| R7 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 3.00 | — | — | — | — | — | |
| | BLAZING MATERIAL 2 | 10.20 | 0.20 | — | 0.10 | — | — | — | 0.05 | — | 10 | |
| R8 | BRAZING MATERIAL 1 | 3.00 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | BLAZING MATERIAL 2 | 3.00 | 0.20 | — | 0.10 | — | — | — | 0.05 | — | 10 | |
| R9 | BRAZING MATERIAL 1 | 15.00 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | BLAZING MATERIAL 2 | 15.00 | 0.20 | — | 0.10 | — | — | — | 0.05 | — | 10 | |
| R10 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 2.00 | 4.00 | — | — | — | 10 | |
| | CORE MATERIAL | 0.30 | 0.40 | 0.15 | 1.20 | 0.80 | — | — | — | — | — | |
| | BLAZING MATERIAL 2 | 10.20 | 0.20 | — | 0.10 | — | — | — | 0.05 | — | 10 | |

TABLE 6

| | TEST MATE- RIAL NO. | CLAD STRUCTURE | INTERME- DIATE MATERIAL GRAIN SIZE (μm) | CORE MATE- RIAL GRAIN SIZE (μm) | BRAZING MATE- RIAL GRAIN SIZE (μm) | BRAZING RESULTS OF MINIATURE CORE TEST MATERIALS | | FLUID COEFFI- CIENT RATIO α | CORRO- SION RESIST- ANCE MAXIMUM CORRO- SION DEPTH (mm) |
|---|---|---|---|---|---|---|---|---|---|
| | | | | | | NOT ETCHED | ETCHED | | |
| COMPAR- ATIVE EXAMPLE | R1 | BRAZING MATERIAL 1 INTERMEDIATE MATERIAL 1 CORE MATERIAL BRAZING MATERIAL 2 | C | A | X | UPPER SIDE:X LOWER SIDE:X | UPPER SIDE:X LOWER SIDE:X | | |
| | R2 | BRAZING MATERIAL 1 INTERMEDIATE MATERIAL 1 CORE MATERIAL BRAZING MATERIAL 2 | X | X | A | | | | |
| | R3 | BRAZING MATERIAL 1 INTERMEDIATE MATERIAL 1 CORE MATERIAL BRAZING MATERIAL 2 | Y | Y | A | UPPER SIDE:○ LOWER SIDE:○ | UPPER SIDE:○ LOWER SIDE:○ | X | |
| | R4 | BRAZING MATERIAL 1 INTERMEDIATE MATERIAL 1 CORE MATERIAL BRAZING MATERIAL 2 | A | B | A | UPPER SIDE:X LOWER SIDE:○ | UPPER SIDE:X LOWER SIDE:○ | B | |
| | R5 | BRAZING MATERIAL 1 INTERMEDIATE MATERIAL 1 CORE MATERIAL BRAZING MATERIAL 2 | D | B | A | | | | |
| | R6 | BRAZING MATERIAL 1 INTERMEDIATE MATERIAL 1 CORE MATERIAL BRAZING MATERIAL 2 | B | B | A | UPPER SIDE:○ LOWER SIDE:X | UPPER SIDE:○ LOWER SIDE:X | A | |
| | R7 | BRAZING MATERIAL 1 INTERMEDIATE MATERIAL 1 CORE MATERIAL BRAZING MATERIAL 2 | Y | Y | A | UPPER SIDE:○ LOWER SIDE:○ | UPPER SIDE:○ LOWER SIDE:○ | X | |
| | R8 | BRAZING MATERIAL 1 INTERMEDIATE MATERIAL 1 CORE MATERIAL BRAZING MATERIAL 2 | C | B | A | UPPER SIDE:X LOWER SIDE:X | UPPER SIDE:X LOWER SIDE:X | B | |

TABLE 6-continued

| TEST MATERIAL NO. | CLAD STRUCTURE | INTERMEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS NOT ETCHED | BRAZING RESULTS OF MINIATURE CORE TEST MATERIALS ETCHED | FLUID COEFFICIENT RATIO α | CORROSION RESISTANCE MAXIMUM CORROSION DEPTH (mm) |
|---|---|---|---|---|---|---|---|---|
| R9 | BRAZING MATERIAL 1 INTERMEDIATE MATERIAL 1 CORE MATERIAL BRAZING MATERIAL 2 | C | B | A | | | | |
| R10 | BRAZING MATERIAL 1 INTERMEDIATE MATERIAL 1 CORE MATERIAL BRAZING MATERIAL 2 | B | B | A | UPPER SIDE:○ LOWER SIDE:○ | UPPER SIDE:○ LOWER SIDE:○ | B | X |

TABLE 7

| | TEST MATERIAL NO. | CLAD STRUCTURE | CHEMICAL COMPOSITION (mass %) | | | | | | | | | CLAD RATIO (%) | WORKING RATIO FROM INTERMEDIATE ANNEALING THICKNESS TO FINAL THICKNESS (%) |
|---|---|---|---|---|---|---|---|---|---|---|---|---|---|
| | | | Si | Fe | Cu | Mn | Mg | Zn | Ti | Bi | OTHERS | | |
| COMPARATIVE EXAMPLE | R11 | BRAZING MATERIAL 1 | 10.20 | 0.20 | — | — | — | — | — | — | — | 10 | 50 |
| | | INTERMEDIATE MATERIAL 1 | 0.20 | 020 | — | — | 2.00 | — | — | — | — | 10 | |
| | | CORE MATERIAL | 0.20 | 0.20 | — | — | 1.00 | — | — | — | — | — | |
| | | INTERMEDIATE MATERIAL 2 | 0.20 | 0.20 | — | — | 2.00 | — | — | — | — | 10 | |
| | | BRAZING MATERIAL 2 | 10.20 | 0.20 | — | — | — | — | — | — | — | 10 | |
| | R12 | BRAZING MATERIAL 1 | 10.20 | 0.20 | — | 0.10 | — | — | — | 0.05 | — | 10 | 10 |
| | | INTERMEDIATE MATERIAL 1 | 0.20 | 0.20 | — | — | 2.00 | — | — | — | — | 10 | |
| | | CORE MATERIAL | 0.30 | 0.40 | 0.15 | 1.20 | 0.80 | — | — | — | — | — | |
| | | INTERMEDIATE MATERIAL 2 | 0.20 | 0.20 | — | — | 2.00 | — | — | — | — | 10 | |
| | | BRAZING MATERIAL 2 | 10.20 | 0.20 | — | 0.10 | — | — | — | 0.05 | — | 10 | |
| | R13 | BRAZING MATERIAL 1 | 10.20 | 0.20 | — | 0.10 | — | — | — | 0.05 | — | 10 | 90 |
| | | INTERMEDIATE MATERIAL 1 | 0.20 | 0.20 | — | — | 2.00 | — | — | — | — | 10 | |
| | | CORE MATERIAL | 0.30 | 0.40 | 0.15 | 1.20 | 0.80 | — | — | — | — | — | |
| | | INTERMEDIATE MATERIAL 2 | 0.20 | 0.20 | — | — | 2.00 | — | — | — | — | 10 | |
| | | BRAZING MATERIAL 2 | 10.20 | 0.20 | — | 0.10 | — | — | — | 0.05 | — | 10 | |
| | R14 | BRAZING MATERIAL 1 | 10.20 | 0.20 | — | 0.10 | — | — | — | 0.05 | — | 10 | 50 |
| | | INTERMEDIATE MATERIAL 1 | 0.20 | 0.20 | — | — | 0.20 | — | — | — | — | 10 | |
| | | CORE MATERIAL | 0.30 | 0.40 | 0.15 | 1.20 | 0.80 | — | — | — | — | — | |
| | | INTERMEDIATE MATERIAL 2 | 0.20 | 0.20 | — | — | 0.20 | — | — | — | — | 10 | |
| | | BRAZING MATERIAL 2 | 10.20 | 0.20 | — | 0.10 | — | — | — | 0.05 | — | 10 | |

TABLE 7-continued

| TEST MATERIAL | | CHEMICAL COMPOSITION (mass %) | | | | | | | | | CLAD RATIO | WORKING RATIO FROM INTERMEDIATE ANNEALING THICKNESS TO FINAL THICKNESS |
|---|---|---|---|---|---|---|---|---|---|---|---|---|
| NO. | CLAD STRUCTURE | Si | Fe | Cu | Mn | Mg | Zn | Ti | Bi | OTHERS | (%) | (%) |
| R15 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 7.00 | — | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 7.00 | — | — | — | — | 10 | |
| | BRAZING MATERIAL 2 | 10.20 | 0.20 | — | 0.10 | — | — | — | 0.05 | — | 10 | |
| R16 | BRAZING MATERIAL 1 | 10.20 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.10 | — | — | — | — | — | |
| | INTERMEDIATE MATERIAL 2 | 0.20 | 0.20 | — | — | 2.00 | — | — | — | — | 10 | |
| | BRAZING MATERIAL 2 | 10.20 | 0.20 | — | 0.10 | — | — | — | 0.05 | — | 10 | |
| R17 | BRAZING MATERIAL 1 | 3.00 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 2.00 | — | — | — | — | 10 | |
| | BRAZING MATERIAL 2 | 3.00 | 0.20 | — | 0.10 | — | — | — | 0.05 | — | 10 | |
| R18 | BRAZING MATERIAL 1 | 15.00 | 0.20 | — | 0.10 | — | — | — | 0.05 | — | 10 | 50 |
| | INTERMEDIATE MATERIAL 1 | 0.20 | 0.20 | — | — | 2.00 | — | — | — | — | 10 | |
| | CORE MATERIAL | 0.30 | 0.40 | 0.15 | 1.20 | 0.80 | — | — | — | — | — | |
| | INTERMEDIATE MATERIAL 2 | 0.20 | 0.20 | — | — | 2.00 | — | — | — | — | 10 | |
| | BRAZING MATERIAL 2 | 15.00 | 0.20 | — | 0.10 | — | — | — | 0.05 | — | 10 | |

TABLE 8

| | TEST MATERIAL NO. | CLAD STRUCTURE | INTERMEDIATE MATERIAL GRAIN SIZE (μm) | CORE MATERIAL GRAIN SIZE (μm) | BRAZING MATERIAL GRAIN SIZE (μm) | BRAZING RESULTS OF MINIATURE CORE TEST MATERIALS | | FLUID COEFFICIENT RATIO α | CORROSION RESISTANCE MAXIMUM CORROSION DEPTH (mm) |
|---|---|---|---|---|---|---|---|---|---|
| | | | | | | NOT ETCHED | ETCHED | | |
| COMPARATIVE EXAMPLE | R11 | BRAZING MATERIAL 1 INTERMEDIATE MATERIAL 1 CORE MATERIAL INTERMEDIATE MATERIAL 2 BRAZING MATERIAL 2 | B | A | X | UPPER SIDE:X LOWER SIDE:X | UPPER SIDE:X LOWER SIDE:X | A | |
| | R12 | BRAZING MATERIAL 1 INTERMEDIATE MATERIAL 1 CORE MATERIAL | X | X | A | | | | |

TABLE 8-continued

| TEST MATE-RIAL NO. | CLAD STRUCTURE | INTERMEDIATE MATERIAL GRAIN SIZE (μm) | CORE MATE-RIAL GRAIN SIZE (μm) | BRAZING MATE-RIAL GRAIN SIZE (μm) | BRAZING RESULTS OF MINIATURE CORE TEST MATERIALS | | FLUID COEFFI-CIENT RATIO α | CORROSION RESISTANCE MAXIMUM CORROSION DEPTH (mm) |
|---|---|---|---|---|---|---|---|---|
| | | | | | NOT ETCHED | ETCHED | | |
| R13 | INTERMEDIATE MATERIAL 2 BRAZING MATERIAL 2 BRAZING MATERIAL 1 INTERMEDIATE MATERIAL 1 CORE MATERIAL | Y | Y | A | UPPER SIDE:○ LOWER SIDE:○ | UPPER SIDE:○ LOWER SIDE:○ | X | |
| R14 | INTERMEDIATE MATERIAL 2 BRAZING MATERIAL 2 BRAZING MATERIAL 1 INTERMEDIATE MATERIAL 1 CORE MATERIAL | A | B | A | UPPER SIDE:X LOWER SIDE:○ | UPPER SIDE:X LOWER SIDE:○ | B | |
| R15 | INTERMEDIATE MATERIAL 2 BRAZING MATERIAL 2 BRAZING MATERIAL 1 INTERMEDIATE MATERIAL 1 CORE MATERIAL | D | B | A | | | | |
| R16 | INTERMEDIATE MATERIAL 2 BRAZING MATERIAL 2 BRAZING MATERIAL 1 INTERMEDIATE MATERIAL 1 CORE MATERIAL | C | B | A | UPPER SIDE:○ LOWER SIDE:X | UPPER SIDE:○ LOWER SIDE:X | B | |
| R17 | INTERMEDIATE MATERIAL 2 BRAZING MATERIAL 2 BRAZING MATERIAL 1 INTERMEDIATE MATERIAL 1 CORE MATERIAL | C | B | A | UPPER SIDE:X LOWER SIDE:X | UPPER SIDE:X LOWER SIDE:X | B | |
| R18 | INTERMEDIATE MATERIAL 2 BRAZING MATERIAL 2 BRAZING MATERIAL 1 INTERMEDIATE MATERIAL 1 CORE MATERIAL INTERMEDIATE MATERIAL 2 BRAZING MATERIAL 2 | C | B | A | | | | |

As illustrated in Table 1 to Table 4, it has been verified that the test materials serving as examples of the present invention acquire the excellent joining state at the acceptable level and the fluid coefficient ratio α of 0.55 or more. The maximum corrosion depth was 0.30 mm or less, which was excellent.

By contrast, the comparative examples illustrated in Table 5 to Table 8 had the following results.

The test pieces R1 and R11 had small grain sizes of the brazing materials and the joining ratios were lowered, because none of Mn, Ti, Zr, and Cr was added to the brazing materials and the Mg quantities diffused into the surfaces were too much. In the test pieces R2 and R12, the grain sizes of the core materials and the intermediate materials were large, which may cause rough surfaces, and the test pieces were not subjected to evaluation of brazability. In the test pieces R3 and R13, the grain sizes of the core materials and the intermediate materials were small, the brazing materials caused erosion on the intermediate materials, and the fluid coefficient ratios were lowered. In the test pieces R4 and R14, the Mg concentrations of the intermediate materials were low, the oxide films were not sufficiently broken in brazing heating, and the joining ratios were lowered. In the test pieces R5 and R15, the Mg concentration of the intermediate materials were high, cracks occurred dining rolling, and no sound plate materials were acquired. In the test pieces R6 and R16, the Mg concentrations of the core materials were low, the oxide films were not sufficiently broken in brazing heating in the brazing materials on the side contacting the core materials, and the joining ratios were lowered. In the test piece R7, the Mg concentration of the core material was high, and the melting point of the core material was lowered. In addition, in the test piece R7, the brazing material Si was diffused into the core material, the core material was molten, and, as a result, the fluid coefficient ratio was lowered. In the test pieces R8 and R17, the Si concentrations of the brazing materials were low, and the joining ratios were lowered. In the test pieces R9 and R18, the Si concentrations of the brazing materials were high, cracks occurred during manufacturing of the test pieces, and no sound plate materials were acquired. In the test piece R10, the Zn concentration of the intermediate material was high, the wearing speed of the intermediate material was high in the SWAAT, no sufficient anticorrosion property was exhibited and corrosion resistance was lowered.

The invention claimed is:

1. An aluminum alloy brazing sheet used for brazing of an aluminum material in an inert gas atmosphere or in vacuum and
    formed of a four-layer material in which a brazing material, an intermediate material, a core material, and a brazing material are stacked in this order,
    the intermediate material being formed of an aluminum alloy and having a grain size of 20 to 300 μm, the aluminum alloy comprising Mg of 0.40 to 6.00 mass %, and optionally one or two or more of Zn of 8.00 mass % or less, Si of 13.00 mass % or less, Bi of 1.00 mass % or less, In of 0.100 mass % or less, Sn of 0.100 mass % or less, and Fe of 1.00 mass % or less, with the balance being aluminum and inevitable impurities,
    the core material being formed of an aluminum alloy and having a grain size of 20 to 300 μm, the aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
    each of the brazing materials being formed of an aluminum alloy comprising Si of 4.00 to 13.00 mass % and further comprising one or two or more of Mn of 2.00 mass % or less, Ti of 0.30 mass % or less, Zr of 0.30 mass % or less, and Cr of 0.30 mass % or less, and optionally one or two or more of Bi of 1.00 mass % or less, Na of 0.050 mass % or less, Sr of 0.050 mass % or less, Sb of 0.050 mass % or less, Mg of 2.00 mass % or less, Zn of 8.00 mass % or less, In of 0.100 mass % or less, Sn of 0.100 mass % or less, Cu of 4.00 mass % or less, and Fe of 1.00 mass % or less, with the balance being aluminum and inevitable impurities, and
    in a drop-type fluidity test, a ratio α ($\alpha=K_a/K_b$) of a fluid coefficient $K_a$ after a 5% strain is applied to a fluid coefficient $K_b$ before the strain is applied being 0.55 or more.

2. The aluminum alloy brazing sheet according to claim 1, wherein the intermediate material further comprises one or two or more of Mn of 2.00 mass % or less, Cu of 1.20 mass % or less, Cr of 0.30 mass % or less, and Zr of 0.30 mass % or less, and a total of contents of Mn, Cr, and Zr is 0.1 mass % or more.

3. An aluminum alloy brazing sheet used for brazing of an aluminum material in an inert gas atmosphere or in vacuum and
    formed of a five-layer material in which a brazing material, an intermediate material, a core material, an intermediate material, and a brazing material are stacked in this order,
    each of the intermediate materials being formed of an aluminum alloy and having a grain size of 20 to 300 μm, the aluminum alloy comprising Mg of 0.40 to 6.00 mass %, and optionally one or two or more of Zn of 8.00 mass % or less, Si of 13.00 mass % or less, Bi of 1.00 mass % or less, In of 0.100 mass % or less, Sn of 0.100 mass % or less, and Fe of 1.00 mass % or less, with the balance being aluminum and inevitable impurities,
    the core material being formed of an aluminum alloy and having a grain size of 20 to 300 μm, the aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
    each of the brazing materials being formed of an aluminum alloy comprising Si of 4.00 to 13.00 mass % and further comprising one or two or more of Mn of 2.00 mass % or less, Ti of 0.30 mass % or less, Zr of 0.30 mass % or less, and Cr of 0.30 mass % or less, and optionally one or two or more of Bi of 1.00 mass % or less, Na of 0.050 mass % or less, Sr of 0.050 mass % or less, Sb of 0.050 mass % or less, Mg of 2.00 mass % or less, Zn of 8.00 mass % or less, In of 0.100 mass % or less, Sn of 0.100 mass % or less, Cu of 4.00 mass % or less, and Fe of 1.00 mass % or less, with the balance being aluminum and inevitable impurities, and
    in a drop-type fluidity test, a ratio α ($\alpha=K_a/K_b$) of a fluid coefficient $K_a$ after a 5% strain is applied to a fluid coefficient $K_b$ before the strain is applied being 0.55 or more.

4. The aluminum alloy brazing sheet according to claim 3, wherein each of the intermediate materials further comprises one or two or more of Mn of 2.00 mass % or less, Cu of 1.20 mass % or less, Cr of 0.30 mass % or less, and Zr of 0.30 mass % or less, and a total of contents of Mn, Cr, and Zr is 0.1 mass % or more.

5. A method for manufacturing the aluminum alloy brazing sheet according to claim 1, the method comprising executing at least hot working, cold working, one or more intermediate annealings between rolling passes in the cold working, and final annealing after a last pass of the cold working on a stacked structure acquired by stacking a brazing material ingot, an intermediate material ingot, a core material ingot, and a brazing material ingot in this order to acquire the aluminum alloy brazing sheet, wherein
 the intermediate material ingot is formed of an aluminum alloy comprising Mg of 0.40 to 6.00 mass %, and optionally one or two or more of Zn of 8.00 mass % or less, Si of 13.00 mass % or less, Bi of 1.00 mass % or less, In of 0.100 mass % or less, Sn of 0.100 mass %4 or less, and Fe of 1.00 mass % or less, with the balance being aluminum and inevitable impurities,
 the core material ingot is formed of an aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
 each of the brazing material ingots is formed of an aluminum alloy comprising Si of 4.00 to 13.00 mass %, and optionally one or two or more of Bi of 1.00 mass % or less, Na of 0.050 mass % or less, Sr of 0.050 mass %4 or less, Sb of 0.050 mass % or less, Mg of 2.00 mass %4 or less, Zn of 8.00 mass % or less, In of 0.100 mass % or less, Sn of 0.100 mass % or less, Cu of 4.00 mass % or less, and Fe of 1.00 mass % or less, with the balance being aluminum and inevitable impurities, and
 a working ratio (working ratio=$((t_a-t_b)/t_a)\times 100$) of a thickness $t_b$ before the final annealing to a thickness $t_a$ after last intermediate annealing among the intermediate annealings is 20 to 70%.

6. A method for manufacturing the aluminum alloy brazing sheet according to claim 2, the method comprising executing at least hot working, cold working, one or more intermediate annealings between rolling passes in the cold working, and final annealing after a last pass of the cold working on a stacked structure acquired by stacking a brazing material ingot, an intermediate material ingot, a core material ingot, and a brazing material ingot in this order to acquire the aluminum alloy brazing sheet, wherein
 the intermediate material ingot is formed of an aluminum alloy comprising Mg of 0.40 to 6.00 mass %, and optionally one or two or more of Zn of 8.00 mass %4 or less, Si of 13.00 mass % or less, Bi of 1.00 mass % or less, In of 0.100 mass % or less, Sn of 0.100 mass % or less, and Fe of 1.00 mass % or less, with the balance being aluminum and inevitable impurities,
 the core material ingot is formed of an aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
 each of the brazing material ingots is formed of an aluminum alloy comprising Si of 4.00 to 13.00 mass %, and optionally one or two or more of Bi of 1.00 mass % or less, Na of 0.050 mass % or less, Sr of 0.050 mass % or less, Sb of 0.050 mass % or less, Mg of 2.00 mass % or less, Zn of 8.00 mass % or less, In of 0.100 mass % or less, Sn of 0.100 mass % or less, Cu of 4.00 mass % or less, and Fe of 1.00 mass % or less, with the balance being aluminum and inevitable impurities, and
 a working ratio (working ratio=$((t_a-t_b)/t_a)\times 100$) of a thickness $t_b$ before the final annealing to a thickness $t_a$ after last intermediate annealing among the intermediate annealings is 20 to 70%.

7. The method for manufacturing the aluminum alloy brazing sheet according to claim 5, wherein the intermediate material ingot further comprises one or two or more of Mn of 2.00 mass % or less, Cu of 1.20 mass % or less, Cr of 0.30 mass % or less, and Zr of 0.30 mass % or less, and a total of contents of Mn, Cr, and Zr is 0.1 mass % or more.

8. A method for manufacturing the aluminum alloy brazing sheet according to claim 3, the method comprising executing at least hot working, cold working, one or more intermediate annealings between rolling passes in the cold working, and final annealing after a last pass of the cold working on a stacked structure acquired by stacking a brazing material ingot, an intermediate material ingot, a core material ingot, an intermediate material ingot, and a brazing material ingot in this order to acquire the aluminum alloy brazing sheet, wherein
 each of the intermediate material ingots is formed of an aluminum alloy comprising Mg of 0.40 to 6.00 mass %, and optionally one or two or more of Zn of 8.00 mass % or less, Si of 13.00 mass % or less, Bi of 1.00 mass % or less, In of 0.100 mass % or less, Sn of 0.100 mass % or less, and Fe of 1.00 mass % or less, with the balance being aluminum and inevitable impurities,
 the core material ingot is formed of an aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
 each of the brazing material ingots is formed of an aluminum alloy comprising Si of 4.00 to 13.00 mass % and further comprising one or two or more of Mn of 2.00 mass % or less, Ti of 0.30 mass % or less, Zr of 0.30 mass % or less, and Cr of 0.30 mass % or less, and optionally one or two or more of Bi of 1.00 mass % or less, Na of 0.050 mass % or less, Sr of 0.050 mass % or less, Sb of 0.050 mass % or less, Mg of 2.00 mass % or less, Zn of 8.00 mass % or less, In of 0.100 mass % or less, Sn of 0.100 mass % or less, Cu of 4.00 mass % or less, and Fe of 1.00 mass % or less, with the balance being aluminum and inevitable impurities, and
 a working ratio (working ratio=$((t_a-t_b)/t_a)\times 100$) of a thickness $t_b$ before the final annealing to a thickness $t_a$ after last intermediate annealing among the intermediate annealings is 20 to 70%.

9. A method for manufacturing the aluminum alloy brazing sheet according to claim 4, the method comprising executing at least hot working, cold working, one or more intermediate annealings between rolling passes in the cold working, and final annealing after a last pass of the cold working on a stacked structure acquired by stacking a brazing material ingot, an intermediate material ingot, a core material ingot, an intermediate material ingot, and a brazing material ingot in this order to acquire the aluminum alloy brazing sheet, wherein
- each of the intermediate material ingots is formed of an aluminum alloy comprising Mg of 0.40 to 6.00 mass %, and optionally one or two or more of Zn of 8.00 mass % or less, Si of 13.00 mass % or less, Bi of 1.00 mass % or less, In of 0.100 mass % or less, Sn of 0.100 mass % or less, and Fe of 1.00 mass % or less, with the balance being aluminum and inevitable impurities,
- the core material ingot is formed of an aluminum alloy comprising Mg of 0.20 to 2.00 mass % and further comprising one or two or more of Mn of 1.80 mass % or less, Si of 1.50 mass % or less, Fe of 1.00 mass % or less, Cu of 1.20 mass % or less, Ti of 0.30 mass % or less, Zr of 0.30 mass % or less, and Cr of 0.30 mass % or less, with the balance being aluminum and inevitable impurities,
- each of the brazing material ingots is formed of an aluminum alloy comprising Si of 4.00 to 13.00 mass % and further comprising one or two or more of Mn of 2.00 mass % or less, Ti of 0.30 mass % or less, Zr of 0.30 mass % or less, and Cr of 0.30 mass % or less, and optionally one or two or more of Bi of 1.00 mass or less, Na of 0.050 mass % or less, Sr of 0.050 mass % or less, Sb of 0.050 mass % or less, Mg of 2.00 mass % or less, Zn of 8.00 mass % or less, In of 0.100 mass % or less, Sn of 0.100 mass % or less, Cu of 4.00 mass % or less, and Fe of 1.00 mass % or less, with the balance being aluminum and inevitable impurities, and
- a working ratio (working ratio=$((t_a-t_b)/t_a)\times 100$) of a thickness $t_b$ before the final annealing to a thickness $t_a$ after last intermediate annealing among the intermediate annealings is 20 to 70%.

10. The method for manufacturing the aluminum alloy brazing sheet according to claim 8, wherein each of the intermediate material ingots further comprises one or two or more of Mn of 2.00 mass or less, Cu of 1.20 mass or less, Cr of 0.30 mass or less, and Zr of 0.30 mass or less, and a total of contents of Mn, Cr, and Zr is 0.1 mass % or more.

* * * * *